(12) United States Patent
Dippel et al.

(10) Patent No.: US 12,552,915 B2
(45) Date of Patent: Feb. 17, 2026

(54) POLYMER COMPOSITION COMPRISING PHOSPHONATE FLAME RETARDANT

(71) Applicant: Chemische Fabrik Budenheim KG, Budenheim (DE)

(72) Inventors: Christian Dippel, Wiesbaden (DE); Birgit Faßbender, Mainz (DE); Sebastian Feidner, Münsterappel (DE); Christian Kudla, Gau-Algesheim (DE); Christian Litterscheid, Ober-Olm (DE); Sebastian Moschel, Groß-Gerau (DE); Tobias Moss, Darmstadt (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 1041 days.

(21) Appl. No.: 17/634,362

(22) PCT Filed: Aug. 12, 2020

(86) PCT No.: PCT/EP2020/072665
§ 371 (c)(1),
(2) Date: Jul. 28, 2022

(87) PCT Pub. No.: WO2021/028496
PCT Pub. Date: Feb. 18, 2021

(65) Prior Publication Data
US 2022/0389191 A1 Dec. 8, 2022

(30) Foreign Application Priority Data

Aug. 12, 2019 (WO) ................ PCT/EP2019/071616
Feb. 13, 2020 (DE) ..................... 10 2020 103 820.8

(51) Int. Cl.
*C08K 5/5357* (2006.01)
*C08G 18/00* (2006.01)
(Continued)

(52) U.S. Cl.
CPC ............ *C08K 5/5357* (2013.01); *C08G 18/00* (2013.01); *C08G 63/00* (2013.01); *C08J 9/141* (2013.01);
(Continued)

(58) Field of Classification Search
CPC .. C08K 5/5357; C08K 5/0066; C08K 5/5353; C08G 18/00; C08G 63/00; C08J 9/141; C08L 67/00; C08L 75/04
See application file for complete search history.

(56) References Cited

U.S. PATENT DOCUMENTS 3,944,599 A 3/1976 Kerst
4,216,163 A 8/1980 Sommer et al.
(Continued)

FOREIGN PATENT DOCUMENTS

BE 865443 A 7/1978
CA 1100995 A 5/1981
(Continued)

OTHER PUBLICATIONS

Veb J. A. Barth et al. "Zur Darstellung von Cyclophosphaten, Cyclophosphato-phosphonaten, Diphosphonaten und Diphosphiten in Harnstoffschmelzen," Z. anorg. allg. Chem, 576, Jan. 1, 1989, pp. 272-280.
(Continued)

*Primary Examiner* — John E Uselding
(74) *Attorney, Agent, or Firm* — MEDLER FERRO WOODHOUSE & MILLS PLLC

(57) ABSTRACT

Compounds containing polymer material and a phosphorous flame protection agent on the basis of an aminomethyl bisphosphonate, a method for manufacturing the compound, the use of the flame retardant, and selected structures of the flame retardant are disclosed.

13 Claims, 8 Drawing Sheets

(51) Int. Cl.
  *C08G 63/00* (2006.01)
  *C08J 9/14* (2006.01)
  *C08K 5/00* (2006.01)
  *C08K 5/5353* (2006.01)
  *C08L 67/00* (2006.01)
  *C08L 75/04* (2006.01)

(52) U.S. Cl.
  CPC .......... *C08K 5/0066* (2013.01); *C08K 5/5353* (2013.01); *C08L 67/00* (2013.01); *C08L 75/04* (2013.01); *C08J 2375/04* (2013.01)

(56) References Cited

U.S. PATENT DOCUMENTS

| | | |
|---|---|---|
| 4,246,206 A | 1/1981 | Mitschke et al. |
| 4,265,963 A | 5/1981 | Matalon |
| 4,873,180 A | 10/1989 | Marchesano et al. |
| 4,935,841 A | 6/1990 | Jonsson et al. |
| 5,276,066 A | 1/1994 | Paulik et al. |
| 5,534,573 A | 7/1996 | Leake |
| 5,844,028 A | 12/1998 | Paulik |
| 2006/0247329 A1 | 11/2006 | Moszner et al. |
| 2010/0199778 A1 | 8/2010 | Hegner et al. |
| 2012/0322923 A1 | 12/2012 | Wermter et al. |
| 2013/0319618 A1 | 12/2013 | Kernbaum et al. |
| 2016/0264394 A1 | 9/2016 | Hershberger et al. |
| 2017/0314981 A1 | 11/2017 | Flockenhaus et al. |
| 2021/0309831 A1 | 10/2021 | Ackermann et al. |

FOREIGN PATENT DOCUMENTS

| | | |
|---|---|---|
| CA | 2027078 A1 | 4/1991 |
| CA | 2092775 A1 | 9/1993 |
| CN | 102741335 A | 10/2012 |
| CN | 104277432 A | 1/2015 |
| CN | 109265479 A | 1/2019 |
| CN | 109265743 A | 1/2019 |
| CN | 109651584 A | 4/2019 |
| DE | 2128060 A1 | 12/1972 |
| DE | 3133308 A1 | 3/1983 |
| DE | 3883995 T2 | 3/1994 |
| DE | 102005019600 A1 | 11/2006 |
| DE | 102007026243 A1 | 12/2008 |
| DE | 102018119835 A1 | 2/2020 |
| EP | 0001996 A1 | 5/1979 |
| EP | 0563730 A2 | 10/1993 |
| EP | 1209163 A1 | 5/2002 |
| FR | 2682385 A1 | 4/1993 |
| JP | 50-095227 A | 7/1975 |
| JP | 54-037829 A | 3/1979 |
| JP | 54-095648 A | 7/1979 |
| JP | S54135724 A | 10/1979 |
| JP | 06-049082 A | 2/1994 |
| JP | 2016-030798 A | 3/2016 |
| WO | 2011/080306 A2 | 7/2011 |
| WO | 2014/124933 A2 | 8/2014 |
| WO | 2017/083468 A1 | 5/2017 |
| WO | 2020/047900 A1 | 3/2020 |

OTHER PUBLICATIONS

Liu, Chuanchuan et al. "Design and Synthesis of Efficient Phosphorus Flame Retardant for Polycarbonate", Industrial & Engineering Chemistry Research, 2017, vol. 56, pp. 8789-8796.

Tong et al., "Comparison of the properties of two phosphorus-nitrogen organic phosphinate flame retardants", Guangdong Chemical Industry, vol. 20, No. 1, 2017, pp. 15-17.

Office Action issued in Indian patent application No. 20147009748, dated Jun. 30, 2022 (in Enalish).

POLYMER COMPOSITION COMPRISING PHOSPHONATE FLAME RETARDANT

CROSS REFERENCE TO RELATED APPLICATIONS

This application is a National Stage of International Application No. PCT/EP2020/072665 filed Aug. 12, 2020, which claims benefit of International Application No. PCT/EP2019/071616 filed Aug. 12, 2019 and German Patent Application No. 10 2020 103 820.8 filed Feb. 13, 2020, each of which are herein incorporated by reference in their entirety.

SUBJECT MATTER OF THE INVENTION

The invention relates to compounds containing a polymer material and a phosphorus flame retardant on the basis of an aminomethylbisphosphonate, a method for manufacturing the compound, the use of the flame retardant, and selected structures of the flame retardant.

BACKGROUND OF THE INVENTION

A plurality of substances are known for equipping polymer materials with flame retardancy; these substances can be used alone or in combination with other substances that provide similar or supplemental flame retardancy. The best-known flame retardants include halogenized organic compounds, metal hydroxides, organic or inorganic phosphates, phosphonates, or phosphinates, along with derivatives of 1,3,5-triazine compounds and mixtures thereof. The flame retardants can be classified as low-molecular and high-molecular. Although high-molecular, or polymeric flame retardants such as the halogenized Polyol Exolit OP 550 from Clariant advantageously have only minor softener effects and a low migration capacity in the polymer material, they are in contrast to low-molecular flame retardant additives frequently during technical processing less readily mixable with the polymer material to be protected, in particular at lower melting capacity. Moreover, the curing of the polymer material can be negatively impacted by adding the high-molecular flame retardant.

A majority of the employed flame retardants are therefore low-molecular compounds. Among others, phosphorous compounds are known to be particularly efficient in this area. In a fire, these can expand into voluminous protective layers in polymer materials, which is called intumescence. This process forms an insulating layer that inhibits the supply of oxygen, which prevents the polymer material from continuing to burn. In the solid phase, the flame-retardant effect can also be based on an increase of the charring rate of the polymer material or on the formation of inorganic glass. The flame-retarding activity is also promoted by a gas phase mechanism that involves greatly slowing down the combustion process of the polymer material by way of radical combination with PO radicals generated by the combustion of the phosphorus compound. The halogenized phosphates Tris(2-chloroethyl)phosphate (TCEP) and Tris (2-chloroisopropyl)phosphate (TCPP) are the most important phosphorous compounds. But their use is increasingly subject to restrictions due to their potential toxicity and ecological problems associated with their use, in particular because such phosphates are subject to bio-accumulation and because municipal water treatment plants have a great deal of difficulty removing these from the waste water. Moreover, they contain halogens, which generate and release HX gases and other toxic compounds in a fire. Such corrosive fire gases represent an elevated risk in particular in electronics applications.

Halogenized and halogen-free phosphates are an alternative to phosphorous flame retardants. Compared to phosphates, these have a particularly pronounced flame-retardant gas phase activity. DE 2 128 060 describes the use of aminomethane phosphonic acid esters with a phosphorus concentration of up to 23.2% by weight as a flame retardant in polyurethanes. The aminomethane phosphonic acid esters are produced from hexamethylenetetramine and dialkyl or diaryl phosphonates. Use of these phosphonates involves dissolving these together with other possibly required additives in the polyol component of a polyurethane formation mixture, followed by adding a polyisocyanate thereto. The esters containing NH groups are incorporated into the polymer material by addition onto the isocyanate group.

EP 0 001 996 relates to the production of N,N-Bis-(2-hydroxylalkyl)aminomethane-phosphonic acid dimethyl esters, which are predominantly used as flame retardant additives in polymer materials, in particular polyurethanes. These are synthesized by adding an H-acidic compound as catalyst to a mixture of dimethylphosphite and oxazolidine. The products have a terminal secondary hydroxyl group and can then be incorporated into the polymer material when the polymer component of a polyurethane formation mixture is added. The added H-acidic substances then however remain in the polymer material, which can impair the characteristics. Alternatively, they need to be transformed into their corresponding alkaline salts before adding the polyol components to separate them from the phosphonic acid esters.

CA 2 027 078 relates to aminomethane phosphonic acid aryl esters, which can be used as flame retardants in foams, thermoplastics, and duroplastics. The corresponding compounds are produced by reacting an amine with trialkyl or triaryl phosphites and paraformaldehyde. The products can either be added to the processed polymer material during the extrusion process or can be used as an additive of the co-condensation component in a polymer condensation reaction.

Liu et al., *Ind. Eng. Chem. Res.* (2017), 56, 8789-8696, discusses DOPO derivates with flame-retardant effect, which are produced from DOPO (9,10-Dihydro-9-oxa-10-phosphaphenanthrene-10-oxide), paraformaldehyde and piperazine. These are halogen-free and have a flame-retardant effect when used in polycarbonates. But like those of the documents cited above, these compounds too only have low thermal stability, which is caused by the weak P—C bond of the P—CH$_2$N group. Although the P—C bond is principally chemically and thermally stable, the a amino group stabilizes the carbon radical generated by the homolysis; the P—C bond in these flame retardants is as a result already broken at relatively low temperatures. Because the tertiary amine formed by the homolysis has a low molar mass, the latter dissipates as a volatile component and causes a corresponding loss of mass. When the flame retardant is embedded in the polymer material, the release of the amine can result in elevated smoke gases. Due to the low decomposition temperature, the flame retardants are partially already break down during the molding process of the polymer material into which they are embedded. Yet another disadvantage of these flame retardants is that they must be added to the polymer material in high concentrations due to their low phosphorus concentration, which significantly impairs the processing, flexibility, and other product characteristics of the polymer material.

Task

Given this background, the task of the present invention was to provide a composition with a polymer material that has a flame retardant with similar or even better flame retardant characteristics than known from the prior art, that can be used in lower concentrations in the composition while also providing good flame retardancy, that only breaks down at temperatures higher than known flame retardants, preferably far above the processing and/or production temperature and slightly below or at the decomposition temperature of the polymer material, and that results in a lower smoke gas density and/or in reduced smoke gas toxicity when it breaks down in the polymer material.

Solution

The invention solves this task by specifying a composition which comprises a polymer material, in particular a thermoset polymer material, and with a flame retardant contained and/or bound therein in a quantity of 1 to 40% by weight in relation to the entire composition, characterized in that the flame retardant is a compound of the formula (I), its corresponding ammonium salt, its corresponding phosphonate salt or a mixture of the aforementioned:

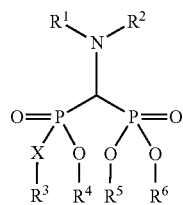

(I)

wherein
(N-i) $R^1$ and $R^2$ are identical or different substituents and are selected from the group consisting of linear, branched, or cyclic alkyles, alkenyles and alkinyles, unsubstituted and alkyl-substituted phenyles, mononuclear and multinuclear aromatics with up to 4 nuclei, mononuclear or multinuclear heteroaromatics with up to 4 nuclei, silyles, allyl, alkyl, or aryl alcohols, or
(N-ii) $R^1$ and $R^2$ together, including the N atom, form a saturated or monounsaturated or polyunsaturated heterocycle with 4-8 ring atoms, selected from carbon, oxygen, sulfur, phosphorus, silicon, and nitrogen, wherein these nitrogen atoms are preferably substituted on the heterocycle—if it has nitrogen atoms as ring atoms—with H, an alkyl, an aryl, or a methylbisphosphonate group having the following structure (II),

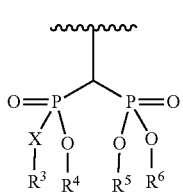

(II)

and wherein on the heterocycle—if it has carbon, phosphorus, or silicon as ring atoms—these atoms can preferably have substituents selected from the group consisting of H, alkyl, aryl, —$NH_2$, —NHR, —$NR_2$, —OH, —OR, =O, —I, —Cl, —Br, F, —$N_3$, —SH, —SR, —OCN, epoxy, lactam, lacton, aziridine, glycolide, oxazoline, ether, alkenylene, and alkinylene, —$SiR_xH_y$, where R=alkyl, alkenyl, alkinyl or aryl and x+y=3,
and wherein —X— is an oxygen atom, —O—, or —X— is a single bond, and
wherein
(P-i) $R^3$, $R^4$, $R^5$ and $R^6$ are identical or different substituents and are selected from the group consisting of H, linear, branched, or cyclic alkyles, alkenyles and alkinyles, unsubstituted and alkylsubstituted phenyles, multinuclear aromatics having up to 4 nuclei, mononuclear or multinuclear heteroaromatics having up to 4 nuclei, silyles, allyl, alkyl or aryl alcohols, of the following structures (III) and (IV), where n=0 to 100,

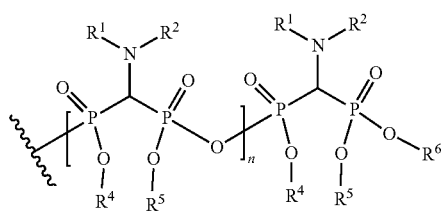

(III)

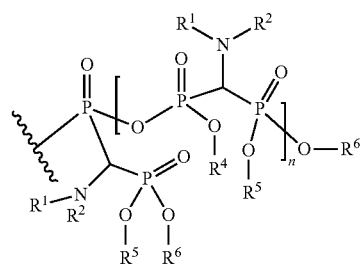

(IV)

and cations wherein the cation is $Na^+$, $K^+$, $Mg^{2+}$, $Ca^{2+}$, $B^{3+}$, $Al^{3+}$, $Zn^{2+}$, $NH_4^+$ or the ammonium ion of an amine compound, selected from the group consisting of melamine or its condensation products, preferably melam, melem, melon, urea, guanidine, morpholine, and piperazine, and/or
(P-ii) when —X— is an oxygen atom, —O—, —$OR^3$ and —$OR^4$ together and/or —$OR^5$ and —$OR^6$ and/or —$OR^3$ and —$OR^5$ together and/or —$OR^4$ and —$OR^6$ together, including the P atom of the phosphonate group, form a cyclic phosphonic acid ester or a cyclic phosphonic acid anhydride having a ring size of 4-10 atoms, and/or
(P-iii) when —X— is a single bond, —$R^3$ and —$OR^4$ and/or —$R^3$ and —$OR^5$ together, including the P atom of the phosphinate group, form a cyclic phosphonic acid ester or a cyclic phosphonic acid anhydride having a ring size of 4-10 atoms and/or —$OR^5$ and —$OR^6$ and/or —$OR^4$ and —$OR^6$ together, including the P atom of the phosphonate group, form a cyclic phosphonic acid ester or a cyclic phosphonic acid anhydride having a ring size of 4-10 atoms, wherein
- A.) one of the substituents $R^1$ to $R^6$ or
- B.) one of the cycles formed when
    1) the substituents $R^3$-$R^6$ form a cyclic phosphine or phosphonic acid ester according to (P-ii) or (P-iii), or
    2) the substituents $R^3$-$R^6$ form a cyclic phosphine or phosphonic acid anhydride according to (P-ii) or (P-iii), or
    3) the substituents $R^1$ and $R^2$ form a heterocycle according to (N-ii), has a first uncharged or negatively charged functional group that has
- a) a heteroatom selected from the group consisting of P, O, N, S, I, Cl, Br, F and/or
- b) an alkene or alkine group, wherein the functional group is not —OH, and for the case that
one of the cycles according to 1) to 3) has the functional group, the ring atoms of the cycles are substituted with the functional group or with a substituent that has the functional group.

The invention defines a functional group as a group of atoms in a bond that materially determines the substance properties and the reactive behavior of the compound, for example because it influences the polarity of the molecule and/or because it can react with other compounds. However, the functional groups specified by the invention do not include those groups of atoms on which one of the heteroatoms or an alkene or alkine groups cited under a) are part of the ring of an aromatic system, e.g. aromatics and heteroaromatics.

For purposes of the invention, the fact that the uncharged or negatively charged functional group is not —OH does not mean that the substituents $R^1$ to $R^6$ or one of the cycles formed when the substituents $R^3$-$R^6$ form a cyclic phosphine or phosphonic acid ester pursuant to (P-ii) or (P-iii) or the substituents $R^3$-$R^6$ form a cyclic phosphine or phosphonic acid anhydride according to (P-ii) or (P-ii) or the substituents $R^1$ and $R^2$ form a heterocycle according to (N-ii) cannot have an OH group. However, for purposes of the invention, these must additionally have a first uncharged or negatively charged functional groups as defined in claim 1.

The substituents $R^1$ to $R^6$ or one of the cycles formed when the substituents $R^3$-$R^6$ form a cyclic phosphine or phosphonic acid ester pursuant to (P-ii) or (P-ii) or the substituents $R^3$-$R^6$ form a cyclic phosphine or phosphonic acid anhydride pursuant to (P-ii) or (P-iii) or the substituents $R^1$ and $R^2$ form a heterocycle pursuant to (N-ii) preferably do not have an OH group. This can for example be advantageous when the OH group would react with other additives in the polymer material.

When the substituents $R^1$ to $R^6$ form a cycle according to 1) to 3), the functional group can only be arranged on the substituents of the ring atoms, and can therefore not be part of the ring itself. The functional group is therefore not arranged in the cycle but on the substituents of the ring atoms of the cycle. $R^1$ to $R^2$ can for example form a morpholine ring and therefore a cycle according to 3); the ether group contained in the ring however does not represent a functional group as defined by the present invention. However, the ring atoms of the morpholine can be additionally substituted either with a functional group according to the invention or with a substituent that has the functional group according to the invention.

In a preferred embodiment, —X— is an oxygen atom, —O—, and —$OR^3$ and —$OR^4$ together, including the P atom of the phosphonate group, form a cyclic phosphonic acid ester or a cyclic phosphonic acid anhydride having a ring size of 4-10 atoms and —$OR^5$ and —$OR^6$ together, including the P atom of the phosphonate group, form a cyclic phosphonic acid ester or a cyclic phosphonic acid anhydride having a ring size of 4-10 atoms.

In a preferred embodiment, —X— is an oxygen atom, —O—, and —$OR^3$ and —$OR^5$ together, including the P atom of the phosphonate group, form a cyclic phosphonic acid ester or a cyclic phosphonic acid anhydride having a ring size of 4-10 atoms and —$OR^4$ and —$OR^6$ together, including the P atom of the phosphonate group, form a cyclic phosphonic acid ester or a cyclic phosphonic acid anhydride having a ring size of 4-10 atoms.

In a further preferred embodiment, —X— is a single bond and —$R^3$ and —$OR^4$ together, including the P atom of the phosphinate group, form a cyclic phosphinic acid ester or a cyclic phosphinic acid anhydride having a ring size of 4-10 atoms and —$OR^5$ and —$OR^6$ together, including the P atom of the phosphonate group, form a cyclic phosphonic acid ester or a cyclic phosphonic acid anhydride having a ring size of 4-10 atoms.

In a further preferred embodiment, —X— is a single bond and —$R^3$ and —$OR^5$ together, including the P atom of the phosphinate group, form a cyclic phosphinic acid ester or a cyclic phosphinic acid anhydride having a ring size of 4-10 atoms and —$OR^4$ and —$OR^6$ together, including the P atom of the phosphonate group, form a cyclic phosphonic acid ester or a cyclic phosphonic acid anhydride having a ring size of 4-10 atoms.

Particularly preferably, $R^1$ and $R^2$ together, including the N atom, form a morpholine or piperidine ring.

In a preferred embodiment of the invention, the substituents $R^3$ to $R^6$ or the cycles formed by the latter have the first functional group.

In a preferred embodiment of the invention, $R^1$ and $R^2$ together, including the N atom, form a heterocycle according to (N-ii), wherein the atoms on the heterocycle—if it has carbon, phosphorus, or silicon as ring atoms—have substituents that are preferably selected from the group consisting of H, alkyl, aryl, —$NH_2$, —$NH_R$, —$NR_2$, —OH, —OR, =O, —I, —CI, —Br, F, —$N_3$, —SH, —SR, —OCN, epoxy, lactam, lacton, aziridine, glycolide, oxazoline, ether, alkenylene and alkinylene, —$SiR_xH_y$, where R=alkyl, alkenyl, alkinyl or aryl and x+y=3.

In a preferred embodiment of the invention, the first and/or second further functional group has a heteroatom from the group consisting of P, O, N, S, Si or an alkene or alkine group. Because halogen-based substituents cause elevated smoke when the flame retardant breaks down in a fire, the smoke gas volume can be minimized by avoiding a halogen substituent.

Particularly preferably, the composition has a total halogen content of <1000 ppm by weight, preferably <850 ppm by weight. The halogen content can be determined by conventional methods known to the person skilled in the art, such as Combustion Ion Chromatography (CIC). The particularly low halogen content is advantageous compared to flame retardants from the prior art, since the known flame retardants have undesirably high amounts of halogen in the form of inorganically and organically bonded halogens. The term "halogen-free" as defined by the invention permits minor contaminants of halogens in the aforementioned maximum values. But halogen must generally be limited in amount to avoid the disadvantageous effects of the halogens.

In a preferred embodiment of the invention, at least one of the substituents $R^3$, $R^4$, $R^5$ and $R^6$ is an organic residual, wherein each of these organic residuals has more than two, preferably more than three carbon atoms.

The flame retardants according to the invention can be produced using the method described in DE 31 33 308 A1. According to the latter, alkylaminomethane-diphosphonic acids or their acrylic derivatives can be obtained in very good yields when the reaction products from acetic anhydride or acetyl chloride and phosphorous acid are converted in stochiometric ratios using alkyl formamides. The highest possible yields are obtained by keeping the reaction temperature of the first conversion phase, e.g. the conversion from acetic anhydride or acetyl chloride with phosphorous acid, between 40-60° C. In place of the reactants acetic anhydride or acetyl chloride and phosphorous acid, the first reaction step can also be performed with a mixture of phosphorous trichloride and acetic acid. Mono and dialkyl formamides, such as methyl and dimethylformamide, ethyl and diethylformamide, and the formyl compounds of morpholine, piperidine, pyrrolidine, oxazolidine, alkanolamines are described as suitable alkyl formamides.

The flame retardants according to the invention have higher thermal stability than the phosphonates known from the prior art, on which the carbon is substituted in a position to the nitrogen with only one phosphonate group. This means that the break down temperature is higher than on comparable known phosphonates. In the context of the invention, the break down temperature is defined as the temperature at which a loss of mass of a dry sample of the flame retardant of 2% by weight is reached. For example, amino trimethylene phosphonic acid (ATMP, CAS: 6419-19-8) already reaches a loss of mass of 2% by weight at 176.4° C. (see FIG. 5). On the phosphonates according to the invention, a corresponding loss of mass is only reached at a much higher temperatures (see FIGS. 2 and 4).

The loss of mass of the sample as a function of temperature can be determined by thermogravimetry. "Dry" in this case means that the water content of the flame retardant is <0.5% by weight. The water content of the flame retardant can be determined with methods known to the person skilled in the art, such as colorimetric Karl Fischer Titration or NIR Spectroscopy. The flame retardant according to the invention is in particular suited for incorporation into a polymer material that is to be processed by extrusion, since it does not break down at the processing temperatures commonly used for extrusion but only at the higher temperatures that occur during fires, and then develops its flame-retardant effect.

The flame retardant according to the invention also features lower incidence of smoke gases. This is also expressed as a higher residual mass after break down.

The inventors assume that the enhanced thermal stability of the flame retardant according to the invention is based on its special structure. The thermal break down of amino methane phosphonates first causes the bond to break on the weak P—C bond of the P—CH$_2$N group. Although the P—C bond is principally chemically and thermally stable, the a amino group stabilizes the carbon radical generated by the homolysis; the P—C bond in these flame retardants is as a result already broken at relatively low temperatures. Since the a amino group on compounds known from the prior art has a relatively low molar weight, the corresponding amine can dissipate as a gaseous product after the homolysis. The dissipation of the amine represents a thermodynamic driving force of the reaction, which therefore occurs preferentially. On flame retardants of the present invention, a further phosphonate group is bonded to the carbon radical in a position to the amine group. The amine as a result has a higher molar weight and can therefore principally only dissipate at a far lower proportion. So that the amine can dissipate at lower temperatures, it would have to have a lower mass; this can only be achieved by also homolytically breaking the P—C bond to the second phosphonate group. But because this would generate a particularly unstable carbanion, this reaction either does not occur, or essentially does not occur at all. Accordingly, any break down in the a polymer material results in notably lower release of amine and therefore in a reduced incidence of smoke gas. Moreover, because the amine does not immediately dissipate after the bond is broken, the reverse reaction, e.g. the combination of the two radicals to the original bond, is possible. The result of the aforementioned effects is that breaking the P—C bond is not as advantageous as is the case on the compounds from the prior art; the amino methane phosphonates according to the invention have much higher thermal stability as a result.

The at least one heteroatom and/or the at least one alkene or alkine group that has the first functional group and any further functional group also results in enhanced flame retardancy. The inventors assume that the heteroatoms and/or the alkene or alkine group can form radicals with their highly-energized free electron pairs and/or π bonding electron pairs. The combination of these radicals with the additional radical generated during the combustion processes slows down the break down reaction. A particularly good flame retardancy behavior is achieved because the flame retardants according to the invention are very uniformly distributed in the polymer material.

In a preferred embodiment of the invention, the substituents $R^1$ to $R^6$ or the cycles formed by these have at least one further functional group that is a heteroatom selected from the group consisting of P, O, N, S, Si, I, Cl, Br, F and/or an alkene or alkine group. This further enhances the effect described above of slowing down the radical-driven break down processes and therefore the flame retardant effect.

In a preferred embodiment of the invention, the substituents $R^1$ to $R^6$ or the cycles formed by these have at least two, preferably at least three, even more preferably at least four, and most preferably at least five further functional groups.

In a preferred embodiment of the invention, the substituents $R^1$ to $R^6$ or the cycles formed by the latter each have at least one functional group. In a particularly preferred embodiment of the invention, the substituents $R^3$ to $R^6$ or the cycles formed by the latter each have at least one functional group. Particularly preferably, the number of functional groups matches for all substituents or the cycles formed by these. Most preferably, $R^3$ to $R^6$ are the same substituents. Such compounds of the general formula (I) are particularly readily obtained, for example by esterification of the corresponding phosphonic acids.

In a preferred embodiment of the invention, the first and/or the further functional group are used to match the polarity of the flame retardant to the polarity of the polymer material. When the flame retardant and the polymer material have comparable polarity, the flame retardant can be more readily incorporated into the polymer material, thus resulting in better distribution. The flame retardant then also has more difficulty migrating from the polymer material.

In a preferred embodiment of the invention, the first and/or further functional group of the flame retardant is selected from the group consisting of —NH$_2$, —NHR, —NR$_2$, —OH, —OR, =O, —SH, —SR, —COOH, —COOR, —OCN, —SCN, —SiR$_x$H$_y$, —I, —Cl, —Br, —F, —N$_3$ and epoxy, lactam, lacton, aziridine, glycolide, oxazoline, where R=alkyl, alkenyl, alkinyl or aryl and x+y=3.

A selection of these functional groups has the advantage that the polarity of the substituents is increased in comparison to alkyl and/or aryl substituents without functional groups. The corresponding flame retardants can therefore be more readily incorporated into polar polymer materials (such as polyacrylates, polyurethanes, or polyamides) and have greater difficulty migrating from the polymer material.

In a further preferred embodiment of the invention, the first and/or further functional group of the flame retardant are selected from the group consisting of —SiR$_x$H$_y$, alkenylenes and alkinylenes, where R=alkyl, alkenyl, alkinyl or aryl and x+y=3.

A selection of these functional groups has the advantage that the polarity of the substituents is reduced in comparison to alkyl and/or aryl substituents without functional groups. The corresponding flame retardant can therefore be more readily incorporated into non-polar polymer materials such as polyalkalenes (e.g. polyethylene, polypropylene) and have greater difficulty migrating from the polymer material.

Moreover, compounds with the aforementioned functional groups can be used as co-monomers for producing the polymer material, thus covalently binding the flame retardant into the polymer material. This has the advantage that the flame retardant either cannot, or can only with great difficulty, migrate from the polymer material. A more uniform distribution of the flame retardant within the polymer material is also achieved. This results in enhanced flame retardancy.

In a preferred embodiment, the first and/or further functional group can be an NH$_2$-group. The flame retardant can then be added to a polymer condensation reaction and be embedded in the polymer chain by reaction with an electrophile group of one of the monomers. An example for this is shown below for the formation of polyamide 6,6.

those of a monomer of the polymer material. The flame retardant can as a result be embedded into the polymer chain without causing a chain termination.

In a particularly preferred embodiment of the invention, the flame retardant according to the invention has at least two different functional groups. The flame retardant can as a result be embedded in different polymerization reactions. For example, one functional group can be an NH$_2$ group, while another can be an alkene group. The flame retardant can then either be embedded into a polymer chain with the alkene group using radical-driven polymerization or using a polycondensation reaction with the NH$_2$ group.

The flame retardants according to the invention have the advantage that they are liquid and/or are readily dissolved in polar solvents, and therefore only have a minor impact on the viscosity of the solvent. The flame retardants according to the invention are therefore readily processed and embedded in polymerization reactions. In particular the viscosity problems that occur during polyaddition and condensation reactions can be reduced by using the flame retardants according to the invention. This causes the Trommsdorf-Norrish effect to occur later; higher mean molar masses of polymer material can therefore be achieved.

In a preferred embodiment, R$^1$ and R$^2$ form a cycle and are the same or different substituents, wherein at least one of the substituents is melamine, wherein the nitrogen atoms of the amino group are substituted with H, an alkyl, an aryl, or a methylbisphosphonate group of the following structure (II).

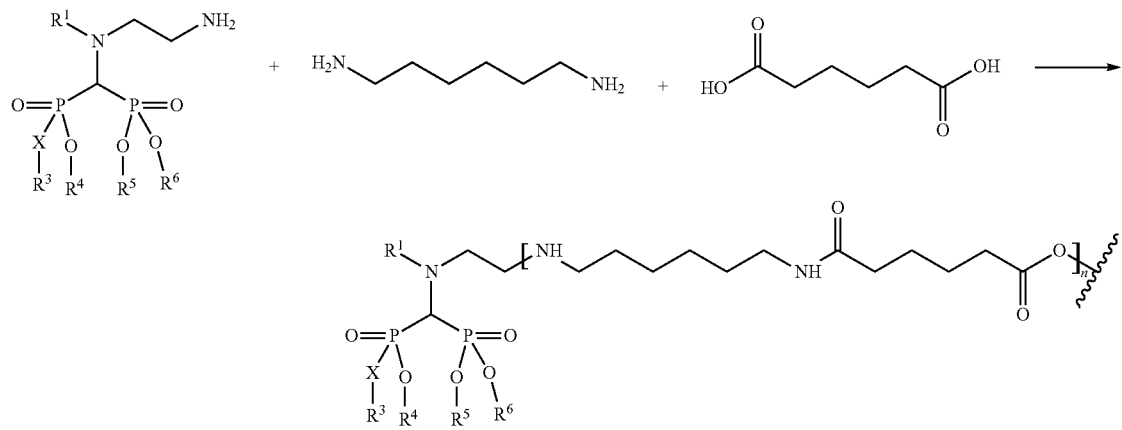

In a particularly preferred embodiment of the invention, the flame retardant according to the invention has a further functional group selected from the group consisting of —NH$_2$, —NHR, —NR$_2$, —OH, —OR, =O, —SH, —SR, —COOH, —COOR, —OCN, —SiR$_x$H$_y$, —I, —Cl, —Br, —F, and epoxy, lactam, lacton, aziridine, glycolide, oxazoline, ether, alkenylene, and alkinylene, where R=alkyl, alkenyl, alkinyl or aryl and x+y=3.

This increases the probability of embedding the flame retardant into the polymer chain and maximizes the advantages associated with embedding. In a particularly preferred embodiment of the invention, the flame retardant according to the invention has at least two functional groups that match

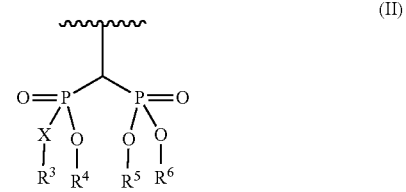

Particularly preferably, on each of the nitrogen atoms of the amino group, one of the substituents is H and the other a methylbisphosphonate group of the structure (II). In another preferred embodiment, both substituents on each of the nitrogen atoms are a methylbisphosphonate group of the structure (II).

The polarity difference of the flame retardant and the polymer material cause polar flame retardants such as the phosphates according to the class to readily migrate from non-polar polymer materials such as polyethylene.

Particularly preferably, the first and/or further functional group of the flame retardant is an alkene or alkine group. This has the advantage that the flame retardant can be bonded during a polymerization reaction, in particular a radical-driven or ion-driven polymerization reaction, to a non-polar polymer material, such as polyolefin. This prevents migration from the polymer material.

In particular when the protected polymer material is not a non-polar polyolefin but a polar polymer such as a polyamide, a polyurethane, or a polyester, it can be advantageous to use the flame retardant according to the invention as an acid. The flame retardant is preferably an acid, specifically when used as co-condensation/addition component. In a preferred embodiment of the invention, at least one, preferably at least two, particularly preferably at least three, most preferably four of the groups are therefore $R^3$, $R^4$, $R^5$ and $R^6H$. The flame retardant according to the invention can for example preferably be added in the form of the acid to a polyurethane foaming process as a co-addition component. Without being bound to this theory, the inventors assume that the reaction of isocyanate and phosphonic acid group embeds the flame retardant into the polymer by forming a particularly stable P—O—C(=O)—N group, which favorably impacts the break down behavior of the polyurethane. This applies similarly for other polymers produced by polyaddition, such as polyethylene oxides, polypropylene oxides, polyethylene glycoles, and polyureas. Here too, the phosphonic acid group reacts with one of the components and is as a result embedded into the polymer. Use of the flame retardant in the form of the acid as co-addition component is therefore particularly preferable when producing these polymers.

Analogously, a preferred embodiment uses the flame retardant according to the invention in the form the acid as co-condensation component in a polymerization reaction. The inventors assume in this case that the phosphonic acid groups react with the hydroxyl or amine groups of the components of the condensation reaction, thus embedding these into the polymer. The flame retardants according to the invention are therefore preferably used in the form of the acid as co-condensation component to produce polyesters, polycarbonates, and polyamides.

In a preferred embodiment of the invention, the substituents $R^3$ and/or $R^4$ and/or $R^5$ and/or $R^6$ organic residuals having more than two carbon atoms. Phosphonic acid esters with short-chained carbon residuals, in particular methyl, are known from the prior art. But because these have an alkylating effect under break down conditions, they can be highly toxic. Human DNA can for example be permanently damaged. But the alkylating effect is greatly reduced as the chain length increases.

The breakdown temperature of the polymer is preferably higher than the processing temperature of the plastic matrix during the thermal processing method by which the polymer is embedded into the plastic matrix. This ensures that no break down processes of the polymer occur when the processing temperature of the plastic matrix is reached. The break down temperature of the polymers is preferably more than 10° C. above the processing temperature of the plastic matrix, particularly preferably more than 20° C. above the processing temperature of the plastic matrix, most preferably more than 50° C. above the processing temperature of the plastic matrix.

When the break down temperature of the polymer is significantly above that of the plastic matrix into which the polymer is embedded, the plastic matrix will in a fire event break down before the polymer can partially break down to develop its flame-retardant effect. Conversely, when the breakdown temperature of the polymer is significantly below that of the plastic matrix, the broken down polymer can already have performed subsequent reactions, thus greatly reducing its flame-retardant effect. The difference between the breakdown temperatures of the polymer and that of the plastic matrix is therefore preferably less than 100° C., particularly preferably less than 50° C., most preferably less than 20° C.

In a preferred embodiment of the invention, the breakdown temperature, e.g. a loss of mass of the dry flame retardant of 2% by weight, is only reached starting at a temperature of 200° C., particularly preferably 220° C., most preferably starting at a temperature of 245° C.

The breakdown temperature of the polymer is determined by relying on the thermogravimetric analysis method described under the "Measurement Methods" section. The breakdown temperature is the temperature at which a loss of mass of the dry sample of 2% is reached, given a heating rate of 10 K/min.

Because the carbon atom is substituted twice in a position to the nitrogen with a phosphonate group, the flame retardants according to the invention have a higher phosphorus content than the phosphonates known from the prior art. We were able to determine that the flame-retarding effect of the phosphorous-based flame retardants increases as the phosphorous content increases. As a result, the effectiveness, e.g. the flame-retarding effect per unit of mass of employed flame retardant, of the flame retardant according to the invention is particularly high. A good flame-retarding effect can then already be achieved even at low concentrations of the flame retardant in the polymer material. At the same time, the properties of the material, in particular its processability and elongation at break, at barely impacted. In a preferred embodiment, the phosphorous content of the flame retardant is at least 10% by weight, preferably at least 12% by weight, particularly preferably at least 14% by weight, most preferably at least 15% by weight. In order to ensure that the phosphorous content of the flame retardant according to the invention is high, the substituents $R^1$-$R^6$ advantageously have the lowest possible mass.

In particular when one or several components of a preferably catalyzed polymerization reaction are added as an additive, it can be advantageous to use the flame retardant according to the invention as a salt or ester, particularly preferably as a salt. This avoids potential interaction of free acid groups of the flame retardant with the components, such as the catalyst of the reaction. The flame retardant according to the invention is also advantageously used as salt or ester on pH-sensitive polymer materials, e.g. polymer materials whose structure changes and/or breaks down when exposed to acids. The salt form can for such applications also be dissolved in water and in some manner homogeneously mixed with the polyol. The water-dissolved salt form can also be readily and homogeneously incorporated in water-based paints and coating systems. When the flame retardant is used as an ester, the associated hydrophobization can additionally promote better bonding to the matrix, which in turn results in improved mechanics and reduced migration from the polymer.

In a preferred embodiment of the invention, at least one, preferably at least two, particularly preferably at least three, most preferably at least four of the groups $R^3$, $R^4$, $R^5$ and $R^6$ are therefore a cation, wherein the cation is $Na^+$, $K^+$, $Mg^{2+}$, $Ca^{2+}$, $B^{3+}$, $Al^{3+}$, $Zn^{2+}$, $NH_4^+$ or the ammonium ion of an amine compound, selected from the group consisting of melamine or its condensation products, preferably melam, melem, melon, urea, guanidine, morpholine and piperazine. $Na^+$ and $Ca^{2+}$ are particularly preferred. $Na^+$ is most preferably used as the cation because it has a low molar mass; as a result, the weight share of phosphorous in the flame retardant can be kept as high as possible.

In a preferred embodiment, the polymer material contains the flame retardant in a quantity of at least 1.5% by weight, or at least 5% by weight, or at least 10% by weight, or at least 15% by weight and/or in a quantity of not more than 35% by weight, or not more than 30% by weight, or not more than 25% by weight, in relation to the entire polymer composition.

In a preferred embodiment of the invention, the entire composition contains polymer material in a quantity of at least 50% by weight, preferably at least 70% by weight, particularly preferably at least 80% by weight, and most preferably at least 90% by weight.

These quantity ratios firstly ensure good flame retardancy of the polymer composition and secondly only have a minor impact on the processing and material properties of the polymer material.

The flame retardant according to the invention can advantageously be used in combination with other flame retardants, e.g. with those that provide flame retardancy by means of another mechanism. The interaction of the flame retardant according to the invention with other flame retardants can achieve a synergistic effect, e.g. an effect that goes beyond the mere sum of the flame retarding effect of the individual components.

The polymer material of the composition according to the invention can be an elastomer, a thermoset, or a thermoplastic polymer material. The polymer material preferably is a thermoset or thermoplastic polymer material, particularly preferably a thermoset polymer material.

In a preferred embodiment, the polymer material contains at least one further flame-retardant component that is preferably selected from nitrogen bases, melamine derivates, phosphates, pyrophosphates, polyphosphates, organic and inorganic phosphinates, organic and inorganic phosphonates and derivatives of the aforementioned compounds, preferably selected from ammoniumpolyphosphate, with melamine, melamine resin, melamine derivatives, silanes, siloxanes, polysiloxanes, silicones or polystyroles, coated and/or uncoated and cross-linked ammoniumpolyphosphate particles, and 1,3,5 triazine compounds, including melamine, melam, melem, melon, ammelin, ammelid, 2 ureido-melamine, acetoguanamine, benzoguanamine, diaminphenyltriazine, melamine salts and adducts, melamine cyanurat, melamine borat, melamine orthophosphate, melamine pyrophosphate, dimelamine pyrophosphate, aluminum diethylphosphinate, melamine polyphosphate, oligomeric and polymeric 1,3,5 triazine compounds and polyphosphates of 1,3,5 triazine compounds, guanin, piperazine phosphate, piperazine polyphosphate, ethylene diaminephosphate, pentaerythritol, dipentaerythritol, boron phosphate, 1,3,5 trihydroxyethylisocyanurate, 1,3,5 triglycidylisocyanurate, triallylisocyanurate and derivatives of the aforementioned compounds. In a preferred embodiment, the polymer material contains waxes, silicons, siloxanes, fats, or mineral oils for improved dispersion of the further flame retardant component.

In addition to the flame retardant according to the invention, the polymer material preferably contains a phosphate, in particular ammoniumpolyphosphate, as a further flame retardant component. The ammoniumpolyphosphate particularly preferably is an ammoniumpolyphosphate of the crystalline forms I, II, or V, or a mixture thereof, the latter particularly preferably being coated.

Ammoniumpolyphosphate of the crystalline form II, which is essentially non-soluble in water compared to other crystalline forms is particularly preferred. This is a powdery substance that already has good flame-retardant effect without coating, while also having low solubility in water. The advantage of using coated aluminum polyphosphate of the crystalline form II is that it has higher thermal stability and higher compatibility with polymers. This results in better dispersion of the flame retardant in the polymer, improved processability of the polymer, and more efficient fire protection.

Because the solid phase activity of phosphates generally exceeds that of phosphonates, and phosphonates by contrast have higher gas phase activity, a combination can result in a particularly pronounced flame-retardant effect.

In a preferred embodiment, the ratio of the flame retardant according to the invention to the at least one further flame retardant component in the polymer material is 1:18 to 1:1, preferably 1:9 to 1:4, and particularly preferably 1:6 to 1:4. These ratios also apply when ammoniumpolyphosphate is used as a further flame retardant component.

In addition to the flame retardant according to the invention, the polymer material also contains other fillers selected from among calciumcarbonate, silicates, such as talcum, clay, or glimmer, Kaolin or Wolastonite, diatomaceous earth, calcium and bariumsulfate, aluminumhydroxide, glass fibers and glass balls, as well as wood flour, cellulose powder and lamp black and graphites. These fillers can result in additionally desired properties of the polymer material. In particular, this can reduce the price of the polymer material, color the polymer material, or improve its mechanical properties, e.g. by reinforcement with glass fibers.

If the flame retardant is incorporated into the protected polymer material using a molding process, a dispersion agent is advantageously used when incorporating the flame retardant. In a further embodiment of the invention, the polymer material according to the invention therefore contains a dispersion agent in a quantity of 0.01 to 10% by weight, preferably in a quantity of 0.1 to 5.0% by weight in relation to the weight of the flame retardant according to the invention, wherein the dispersion agent is preferably selected among fatty acids, including fatty acid amides, including fatty acid monoamides, fatty acid bisamides and fatty acid alkanolamides, such as oleamides and erucamides, among fatty acid esters, including glycerol esters and wax esters, among C16 to C18 fatty acids, among fatty acid alcohols, including cetyl and stearyl fatty acid alcohols, among natural and synthetic waxes, polyethylene waxes and oxidized polyethylene waxes, and among metal stearates, preferably Ca, Zn, Mg, Ba, Al, Cd and Pb stearates. Adding the aforementioned dispersion agents improves the ability to dose the flame retardant, the ability to extrude the polymer material, and the homogeneity of the dispersed flame retardant within the polymer material.

In a further embodiment of the invention, the flame retardant according to the invention has a content of free water (moisture content) of <0.6% by weight, preferably <0.4% by weight. A low water content likewise improves the ability to dose the flame retardant, the ability to extrude the polymer material, and the homogeneity of the dispersed flame retardant within the composition, and prevents hydrolysis-induced break down.

The flame retardant can be incorporated into the polymer material with various methods. The flame retardant can firstly be embedded into the polymer material during the molding process. If the polymer material is for example processed by extrusion, the flame retardant can be added during the extrusion process, e.g. using a master batch. A master batch as defined by the present invention is a polymer material in granulate or powder form that contains the flame retardant and any other additives in concentrations higher than in the final application. In order to produce the polymer material according to the invention, the master batch or various master batches are combined with further polymer material without the flame retardant contained in the master batch in quantities or ratios that correspond to the desired concentrations of the flame retardant in the end product. Compared to adding various substances in the form of pastes, powders, or liquids, master batches have the advantage that they ensure high process reliability and are readily processed and dosed. The flame retardant is evenly distributed in the polymer material by extrusion.

Polymer materials into which the flame retardant can be incorporated are preferably selected from the group consisting of polyvinylbutyral (PVB), polypropylene (PP), polyethylene (PE), polyamide (PA), polyester such as polybutyleneterephthalat (PBT), polyethyleneterephthalat (PET), polyurethane (PU), thermoplastic polyurethanes (TPU) polyurea, polyphenylenoxide, polyacetal, polyacrylate, polymethacrylate, polyoxymethylene, polyvinylacetal, polystyrole, acryl-butadien-styrole (ABS), acrylnitrile-styrole-acrylester (ASA), polycarbonate, polyethersulfon, polysulfonate, polytetrafluoroethylene, polyurea, formaldehyde resins, melamine resins, polyetherketon, polyvinylchloride, polylactid, polysiloxan, phenol resins, epoxy resins, Poly(imid), bismaleimid-triazin, thermoplastic polyurethane, ethylene-vinylacetate-copolymer (EVA), polylactid (PLA), polyhydro butyric acid (PHB), copolymers and/or mixtures of the aforementioned polymers. The flame retardant according to the invention is particularly preferably used in foams of the aforementioned polymer materials, particularly preferably in polyurethane foams. The flame retardant is in this case preferably added as an additive or co-condensation/addition component of the polyol component. When the flame retardant is added as an additive, the latter is preferably a salt or an ester. When the flame retardant is added as a co-condensation/addition component, the latter is preferably an acid.

We were able to observe that these phosphonates not only have a flame-retarding effect, but can also catalyze the polyurethane foaming.

The invention also comprises a flame retardant that is a compound of the formula I, its corresponding ammonium salt, its corresponding phosphonate salt, or a mixture thereof, wherein the substituents $R^3$ to $R^6$ or the cycles formed by these preferably have the first functional group and/or are not more than three of the substituents $R^3$ to $R^6$ H.

The invention also comprises a method for producing a flame retardant that comprises the following steps:
Provide a mixture of
a) at least one phosphonic or phosphinic acids, selected from the group consisting of the compounds of the formulae (V) and (VI) in a reaction vessel,

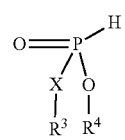

(V)

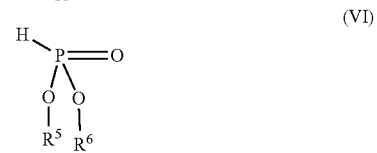

(VI)

wherein —X— is an oxygen atom, —O—, or —X— is a single bond, and
wherein
(P-i) $R^3$, $R^4$, $R^5$ and $R^6$ are identical or different substituents and are selected from the group consisting of H, linear, branched, or cyclic alkyles, alkenyles and alkinyles, unsubstituted and alkylsubstituted phenyles, multinuclear aromatics having up to 4 nuclei, mononuclear or multinuclear heteroaromatics having up to 4 nuclei, silyles, allyl, alkyl or aryl alcohols, of the following structures (Ill) and (IV), where n=0 to 100,

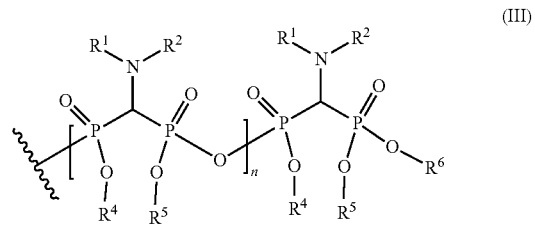

(III)

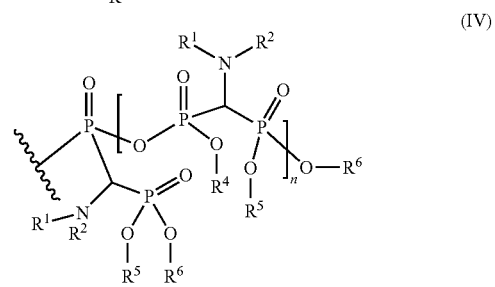

(IV)

and cations wherein the cation is $Na^+$, $K^+$, $Mg^{2+}$, $Ca^{2+}$, $B^{3+}$, $Al^{3+}$, $Zn^{2+}$, $NH_4^+$ or the ammonium ion of an amine bond, selected from the group consisting of melamine or its condensation products, preferably melam, melem, melon, urea, guanidine, morpholine, and piperazine, and/or (P-ii) when —X— is an oxygen atom, —O—, —OR$^3$ and —OR$^4$ together and/or —OR$^5$ and —OR$^6$ and/or —OR$^3$ and —OR$^5$ together and/or —OR$^4$ and —OR$^6$ together, including the P atom of the phosphonate group, form a cyclic phosphonic acid ester or a cyclic phosphonic acid anhydride having a ring size of 4-10 atoms, and/or (P-iii) when —X— is a single bond, —R$^3$ and —OR$^4$ and/or —R$^3$ and —OR$^5$ together, including the P atom of the phosphinate group, form a cyclic phosphonic acid ester or a cyclic phosphonic acid anhydride having a ring size of 4-10 atoms and/or —OR$^5$ and —OR$^6$ and/or —OR$^4$ and —OR$^6$ together, including the P atom of the phosphonate group, form a cyclic phosphonic acid ester or a cyclic phosphonic acid anhydride having a ring size of 4-10 atoms, b) $HC(OR^7)_3$, where $R^7$=alkyl, aryl or alkenyl, preferably triethoxymethane, c) of an amino compound of the formula (VII),

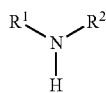

(VII)

wherein (N-i) $R^1$ and $R^2$ are identical or different substituents and are selected from the group consisting of linear, branched, or cyclic alkyles, alkenyles and alkinyles, unsubstituted and alkyl-substituted phenyles, mononuclear and multinuclear aromatics with up to 4 nuclei, mononuclear or multinuclear heteroaromatics with up to 4 nuclei, silyles, allyl, alkyl, or aryl alcohols, or (N-ii) $R^1$ and $R^2$ together, including the N atom, form a saturated or monounsaturated or polyunsaturated heterocycle with 4-8 ring atoms, selected from carbon, oxygen, sulfur, phosphorus, silicon, and nitrogen, wherein these nitrogen atoms are preferably substituted on the heterocycle—if it has nitrogen atoms as ring atoms—with H, an alkyl, an aryl, or a methylbisphosphonate group having the following structure (II),

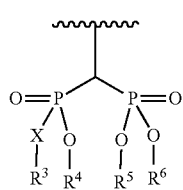

(II)

and wherein on the heterocycle—if it has carbon, phosphorus, or silicon as ring atoms—these atoms can preferably have substituents selected from the group consisting of H, alkyl, aryl, —$NH_2$, —NHR, —$NR_2$, —OH, —OR, =O, —I, —Cl, —Br, F, —$N_3$, —SH, —SR, —OCN, epoxy, lactam, lacton, aziridin, glycolide, oxazolin, alkenylene, and alkinylene, —$SiR_xH_y$, where R=alkyl, alkenyl, alkinyl or aryl and x+y=3, wherein preferably A.) one of the substituents $R^1$ to $R^6$ or B.) one of the cycles formed when 1) the substituents $R^3$-$R^6$ form a cyclic phosphine or phosphonic acid ester according to (P-ii) or (P-iii), or 2) the substituents $R^3$-$R^6$ form a cyclic phosphine or phosphonic acid anhydride according to (P-ii) or (P-iii), or 3) the substituents $R^1$ and $R^2$ form a heterocycle according to (N-ii), has a first uncharged or negatively charged functional group that has a) a heteroatom selected from the group consisting of P, O, N, S, I, CI, Br, F and/or b) an alkene or alkine group, wherein the functional group is not —OH, and for the case that one of the cycles according to 1) to 3) has the functional group, the ring atoms of the cycles are substituted with the functional group or with a substituent that has the functional group.

Heat the mixture to a temperature in the range from 40-150° C.

The heating of the mixture can be followed by a purification step. The latter preferably comprises a destillative or chromatographic purification of the mixture.

During conversion, the phosphonic or phosphinic acids or the amino compound of the formula (VII) rely on the free electron pairs of the PH or NH groups to create a nucleophile bond to the central carbon atom of the orthoester $HC(OR^7)_3$. This generates a compound of the formula (I) while releasing three equivalents of the alcohol $HOR^7$.

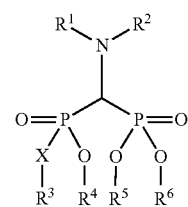

(I)

In order to achieve higher conversions, a preferred embodiment of the invention involves separating $HOR^7$ during the conversion, preferably by distillation, particularly preferably by distillation under reduced pressure.

The invention also comprises a method for producing the compounds of the general formulae (V) and (VI).

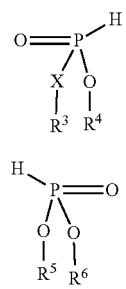

These can be obtained by esterification of the phosphinic or phosphonic acids with a compound of the formula $HC(OR^{3/4/5/6})_3$. In a preferred embodiment of this method, $HC(OR^{3/4/5/6})_3$ is triethoxymethane. For the purpose of the method according to the invention, phosphinic or phosphonic acids are mixed with a compound of the formula $HC(OR^{3/4/5/6})_3$ and heated to a temperature ranging from 40-140° C., preferably 80-120° C., more preferably 90-120° C. and most preferably 100-120° C. The mixture is particularly preferably heated to a boil. The reaction mixture is stirred at these temperatures for a period of 10 min to 10 h, preferably for a period of 1 hr. to 5 hrs., more preferably 1 hr. to 3 hrs., and most preferably 1 hr. to 2 hrs. After this reaction period, the reaction solution for fractioned distillation will contain one fraction with the main ingredient $HOR^{3/4/5/6}$ and a further fraction with the compound of the formula (V) or (VI).

The aforementioned method is particularly preferably used for producing diethyiphosphite.

The invention also comprises use of a compound of the formula (I), its corresponding ammonium salt, its corresponding phosphonate salt, or a mixture for surface treatment, preferably in the form of a coating,

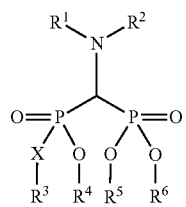
(I)

wherein (N-i) $R^1$ and $R^2$ are identical or different substituents and are selected from the group consisting of linear, branched, or cyclic alkyles, alkenyles and alkinyles, unsubstituted and alkylsubstituted phenyles, mononuclear and multinuclear aromatics with up to 4 nuclei, mononuclear or multinuclear heteroaromatics with up to 4 nuclei, silyles, allyl, alkyl, or aryl alcohols, or (N-ii) $R^1$ and $R^2$ together, including the N atom, form a saturated or monounsaturated or polyunsaturated heterocycle with 4-8 ring atoms, selected from carbon, oxygen, sulfur, phosphorus, silicon, and nitrogen, wherein these nitrogen atoms are preferably substituted on the heterocycle—if it has nitrogen atoms as ring atoms—with H, an alkyl, an aryl, or a methylbisphosphonate group having the following structure (II),

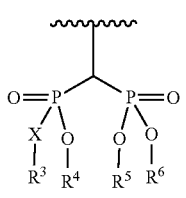
(II)

and wherein on the heterocycle—if it has carbon, phosphorus, or silicon as ring atoms—these atoms can preferably have substituents selected from the group consisting of H, alkyl, aryl, —$NH_2$, —NHR, —$NR_2$, —OH, —OR, =O. —I, —Cl, —Br, F, —$N_3$, —SH, —SR, —OCN, epoxy, lactam, lacton, aziridin, glycolide, oxazolin, alkenylene, and alkinylene, —$SiR_xH_y$, where R=alkyl, alkenyl, alkinyl or aryl and x+y=3, and wherein —X— is an oxygen atom, —O—, or —X— is a single bond, and wherein (P-i) $R^3$, $R^4$, $R^5$ and $R^6$ are identical or different substituents and are selected from the group consisting of H, linear, branched, or cyclic alkyles, alkenyles and alkinyles, unsubstituted and alkylsubstituted phenyles, multinuclear aromatics having up to 4 nuclei, mononuclear or multinuclear heteroaromatics having up to 4 nuclei, silyles, allyl, alkyl or aryl alcohols, of the following structures (III) and (IV), where n=0 to 100,

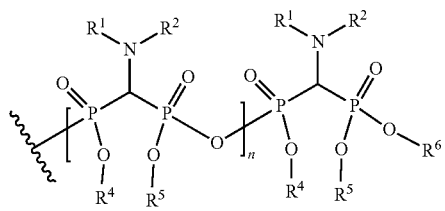
(III)

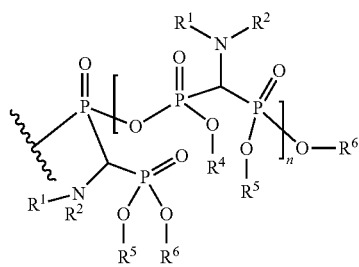
(IV)

and cations wherein the cation is $Na^+$, $K^+$, $Mg^{2+}$, $Ca^{2+}$, $B^{3+}$, $Al^{3+}$, $Zn^{2+}$, $NH_4^+$ or the ammonium ion of an amine bond, selected from the group consisting of melamine or its condensation products, preferably melam, melem, melon, urea, guanidine, morpholine, and piperazine, and/or (P-ii) when —X— is an oxygen atom, —O—, —$OR^3$ and —$OR^4$ together and/or —$R^5$ and —$OR^6$ and/or —$OR^3$ and —$OR^5$ together and/or —$OR^4$ and —$OR^6$ together, including the P atom of the phosphonate group, form a cyclic phosphonic acid ester or a cyclic phosphonic acid anhydride having a ring size of 4-10 atoms, and/or (P-iii) when —X— is a single bond, —$R^3$ and —$OR^4$ and/or —$R^3$ and —$OR^5$ together, including the P atom of the phosphinate group, form a cyclic phosphonic acid ester or a cyclic phosphonic acid anhydride having a ring size of 4-10 atoms and/or —$OR^5$ and —$OR^6$ and/or —$OR^4$ and —$OR^6$ together, including the P atom of the phosphonate group, form a cyclic phosphonic acid ester or a cyclic phosphonic acid anhydride having a ring size of 4-10 atoms, wherein preferably A.) one of the substituents $R^1$ to $R^6$ or B.) one of the cycles formed when 1) the substituents $R^3$-$R^6$ form acyclic phosphinic or phosphonic acid ester according to (P-ii) or (P-iii), or 2) the substituents $R^3$-$R^6$ form a cyclic phosphinic or phosphonic acid anhydride according to (P-ii) or (P-iii), or 3) the substituents $R^1$ and $R^2$ form a heterocycle according to (N-ii), has a first uncharged or negatively charged functional group that has a) a heteroatom selected from the group consisting of P, O, N, S, I, Cl, Br, F and/or b) an alkene or alkine group, wherein the functional group is not —OH, and for the case that one of the cycles according to 1) to 3) has the functional group, the ring atoms of the cycles are substituted with the functional group or with a substituent that has the functional group.

In a preferred embodiment, the coating acts a flame retardant for an object, particularly preferably as a flame retardant for a polymer material.

This embodiment is particularly preferably used as a surface treatment of metals or polymer materials, in particular for thermoset polymers. Use in composites is for example particularly preferred. In this case, the aforementioned phosphonates can be applied onto the polymer matrix and/or the reinforcement material (e.g. glass fibers) in liquid form, for example as a solution or as a liquid pure substance. The advantage in this case is that the flame retardants according to the invention are liquid or only cause a minor change of viscosity in suspension. The flame retardant can as a result be evenly distributed in the composite. The flame retardants known from the prior art are by contrast generally solids or require large quantities of solvent to obtain a low-viscosity solution. As a result, these can only be incorporated into the composite material at great difficulty. A woven composite material also causes a filtration effect of the flame retardant. Protection is as a result only provided on one side. The aforementioned disadvantages can be overcome with the flame retardants according to the invention.

In a particularly preferred embodiment of the invention, the compound of the formula (I) is used to form a coating, for example a gelcoat. This has the advantage that the compounds according to the invention have good solubility in a plurality of polar solvents. A uniform distribution in the solvent and therefore ultimately on the treated surface can be achieved as a result. Due to the good solubility, the viscosity of the solution is either not influenced, or only to minor degree.

The compound of the formula (I) is preferably used for coating with 1 to 40% by weight, more preferably 2 to 30% by weight, even more preferably 3 to 20% by weight, most preferably 4 to 10% by weight, in relation to the entire coating composition.

Solutions of the compounds of formula (I) can for example be used to coat textile, paper, ceramics, or composites or their intermediate phases, such as prepregs.

Due to the low absorption and the homogeneous mixability with the further components of coating system, in particular with the binder, the compounds of formula (I) are preferably suited for so-called "clear coatings", or transparent coatings. Such clear coatings are in particular advantageous when the structure located under the coating is not be concealed, for example for clear coatings on wood.

EXAMPLES

The invention will now be discussed in detail based on concrete embodiments of flame retardants according to the invention, manufacturing examples for compositions according to the invention, and based on flame retardant examples, and based on the enclosed drawings.

Concrete Embodiments of Flame Retardant. According to the Invention

Embodiments with a First Functional Group on the Amino Group

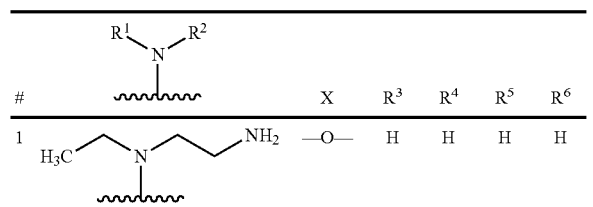

| # | | X | $R^3$ | $R^4$ | $R^5$ | $R^6$ |
|---|---|---|---|---|---|---|
| 1 | $H_3C$—N—CH$_2$CH$_2$—NH$_2$ | —O— | H | H | H | H |

-continued

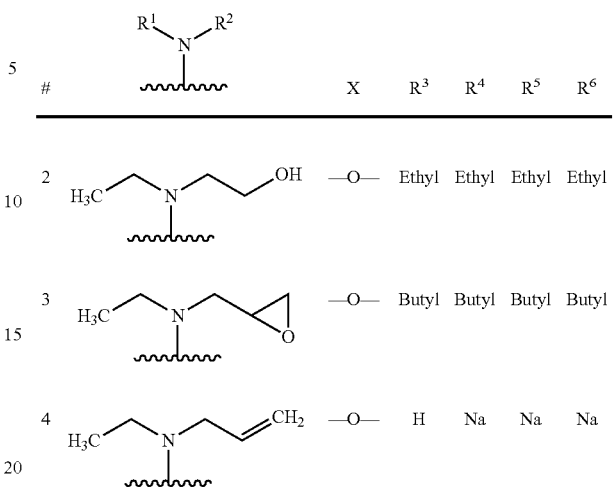

| # | | X | $R^3$ | $R^4$ | $R^5$ | $R^6$ |
|---|---|---|---|---|---|---|
| 2 | $H_3C$—N—CH$_2$CH$_2$—OH | —O— | Ethyl | Ethyl | Ethyl | Ethyl |
| 3 | $H_3C$—N—CH$_2$-epoxide | —O— | Butyl | Butyl | Butyl | Butyl |
| 4 | $H_3C$—N—CH$_2$CH=CH$_2$ | —O— | H | Na | Na | Na |

Embodiments with a First and Second Functional Group on the Amino Group

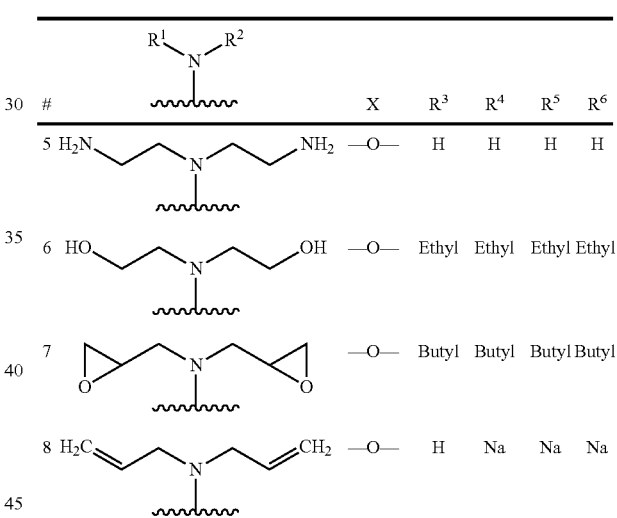

| # | | X | $R^3$ | $R^4$ | $R^5$ | $R^6$ |
|---|---|---|---|---|---|---|
| 5 | $H_2N$—CH$_2$CH$_2$—N—CH$_2$CH$_2$—NH$_2$ | —O— | H | H | H | H |
| 6 | $HO$—CH$_2$CH$_2$—N—CH$_2$CH$_2$—OH | —O— | Ethyl | Ethyl | Ethyl | Ethyl |
| 7 | epoxide—CH$_2$—N—CH$_2$—epoxide | —O— | Butyl | Butyl | Butyl | Butyl |
| 8 | $H_2C$=CH—CH$_2$—N—CH$_2$—CH=CH$_2$ | —O— | H | Na | Na | Na |

Embodiments with a First Functional Group on One of the Phosphonic Acid Groups

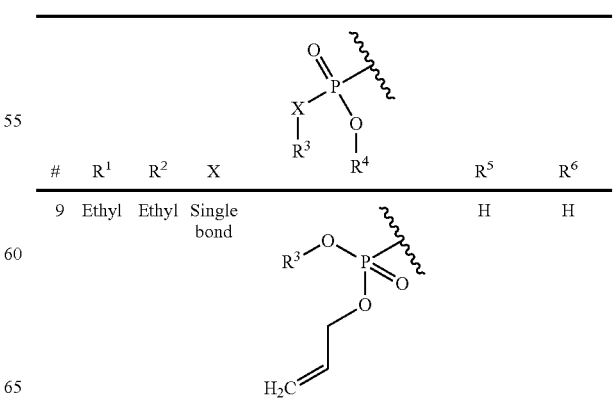

| # | $R^1$ | $R^2$ | X | $R^4$ | $R^5$ | $R^6$ |
|---|---|---|---|---|---|---|
| 9 | Ethyl | Ethyl | Single bond | $R^3$O—P(=O)(O—CH$_2$CH=CH$_2$)—O— | H | H |

-continued

| # | R¹ | R² | X | R⁴ structure | R⁵ | R⁶ |
|---|----|----|---|---|----|----|
| 10 | Ethyl | Ethyl | Single bond | $R^3$-O-P(=O)(-O-CH$_2$-CH=CH$_2$)- | Na | Na |
| 11 | Ethyl | Ethyl | Single bond | $R^3$-O-P(=O)(-O-CH$_2$-CH=CH$_2$)- | Methyl | Methyl |
| 12 | Ethyl | Ethyl | Single bond | $R^3$-O-P(=O)(-O-CH$_2$-CH=CH$_2$)- | Ethyl | Ethyl |
| 13 | Ethyl | Ethyl | Single bond | $R^3$-O-P(=O)(-O-CH$_2$-CH=CH$_2$)- | Butyl | Butyl |

Embodiments with a First Functional Group on One of the Phosphonic Acid Groups

| # | R¹ | R² | X | R⁴ structure | R⁵ | R⁶ |
|---|----|----|---|---|----|----|
| 14 | Ethyl | Ethyl | Single bond | $R^3$-O-P(=O)(-O-CH$_2$-CH$_2$-NH$_2$)- | H | H |

-continued

| # | R¹ | R² | X | R⁴ structure | R⁵ | R⁶ |
|---|----|----|---|---|----|----|
| 15 | Ethyl | Ethyl | Single bond | $R^3$-O-P(=O)(-O-CH$_2$-CH$_2$-NH$_2$)- | Na | Na |
| 16 | Ethyl | Ethyl | Single bond | $R^3$-O-P(=O)(-O-CH$_2$-CH$_2$-NH$_2$)- | Methyl | Methyl |
| 17 | Ethyl | Ethyl | Single bond | $R^3$-O-P(=O)(-O-CH$_2$-CH$_2$-NH$_2$)- | Ethyl | Ethyl |
| 18 | Ethyl | Ethyl | Single bond | $R^3$-O-P(=O)(-O-CH$_2$-CH$_2$-NH$_2$)- | Butyl | Butyl |

Embodiments with a First Functional Group on One of the Phosphonic Acid Groups

| # | R¹ | R² | X | R⁴ structure | R⁵ | R⁶ |
|---|----|----|---|---|----|----|
| 18 | Ethyl | Ethyl | Single bond | $R^3$-O-P(=O)(-O-CH$_2$-CH$_2$-SH)- | H | H |

-continued

| # | R¹ | R² | X | R⁴ | R⁵ | R⁶ |
|---|----|----|---|----|----|----|
| 19 | Ethyl | Ethyl | Single bond | (R³–O–P(=O)(–O–CH₂CH₂–SH)–) | Na | Na |
| 20 | Ethyl | Ethyl | Single bond | (R³–O–P(=O)(–O–CH₂CH₂–SH)–) | Ethyl | Ethyl |
| 21 | Ethyl | Ethyl | Single bond | (R³–O–P(=O)(–O–CH₂CH₂–SH)–) | Ethyl | Ethyl |
| 22 | Ethyl | Ethyl | Single bond | (R³–O–P(=O)(–O–CH₂CH₂–SH)–) | Butyl | Butyl |

Embodiments with a First Functional Group on One of the Phosphonic Acid Groups

| # | R¹ | R² | X | R⁴ | R⁵ | R⁶ |
|---|----|----|---|----|----|----|
| 23 | Ethyl | Ethyl | Single bond | (R³–O–P(=O)(–O–CH₂–glycidyl)–) | H | H |
| 24 | Ethyl | Ethyl | Single bond | (R³–O–P(=O)(–O–CH₂–glycidyl)–) | Na | Na |
| 25 | Ethyl | Ethyl | Single bond | (R³–O–P(=O)(–O–CH₂–glycidyl)–) | Ethyl | Ethyl |
| 26 | Ethyl | Ethyl | Single bond | (R³–O–P(=O)(–O–CH₂–glycidyl)–) | Butyl | Butyl |

Embodiments with a First and Second Functional Group on the Phosphonic Acid Groups

| # | R¹ | R² | X | R⁴ | R⁵ | R⁶ |
|---|----|----|---|----|----|----|
| 27 | Ethyl | Ethyl | Single bond | (R³–O–P(=O)(–O–CH₂–glycidyl)–) | (R⁶–O–P(=O)(–O–CH₂–glycidyl)–) | H |
| 28 | Ethyl | Ethyl | Single bond | (R³–O–P(=O)(–O–CH₂–glycidyl)–) | (R⁶–O–P(=O)(–O–CH₂–glycidyl)–) | Na |

-continued
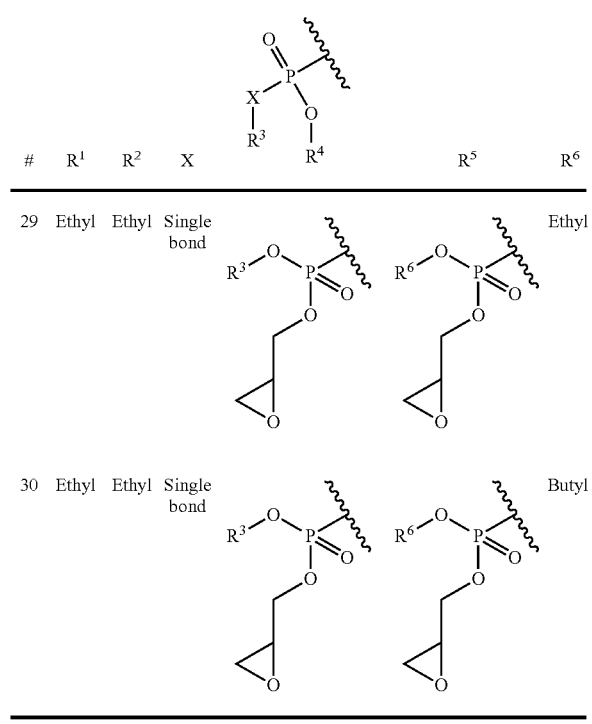
Embodiments with a First Functional Group on One of the Phosphonic Acid Groups
-continued
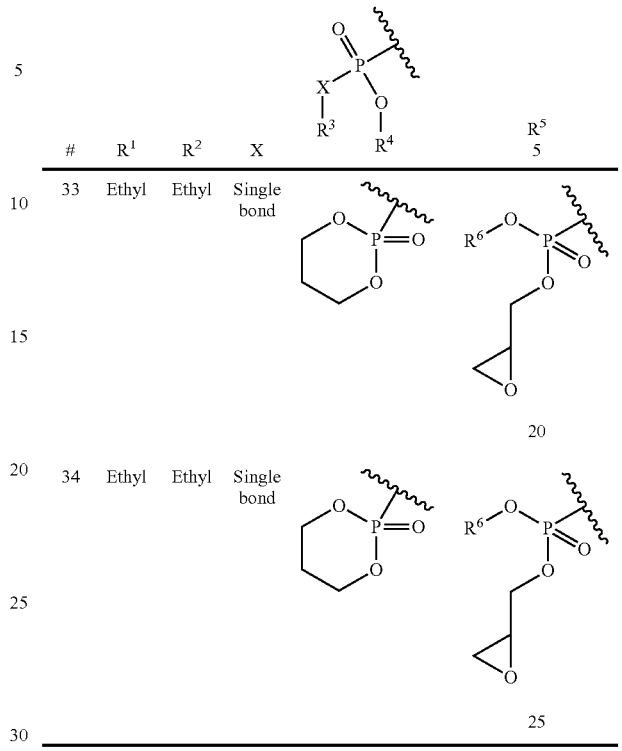
Embodiments with First Cyclic Functional Group
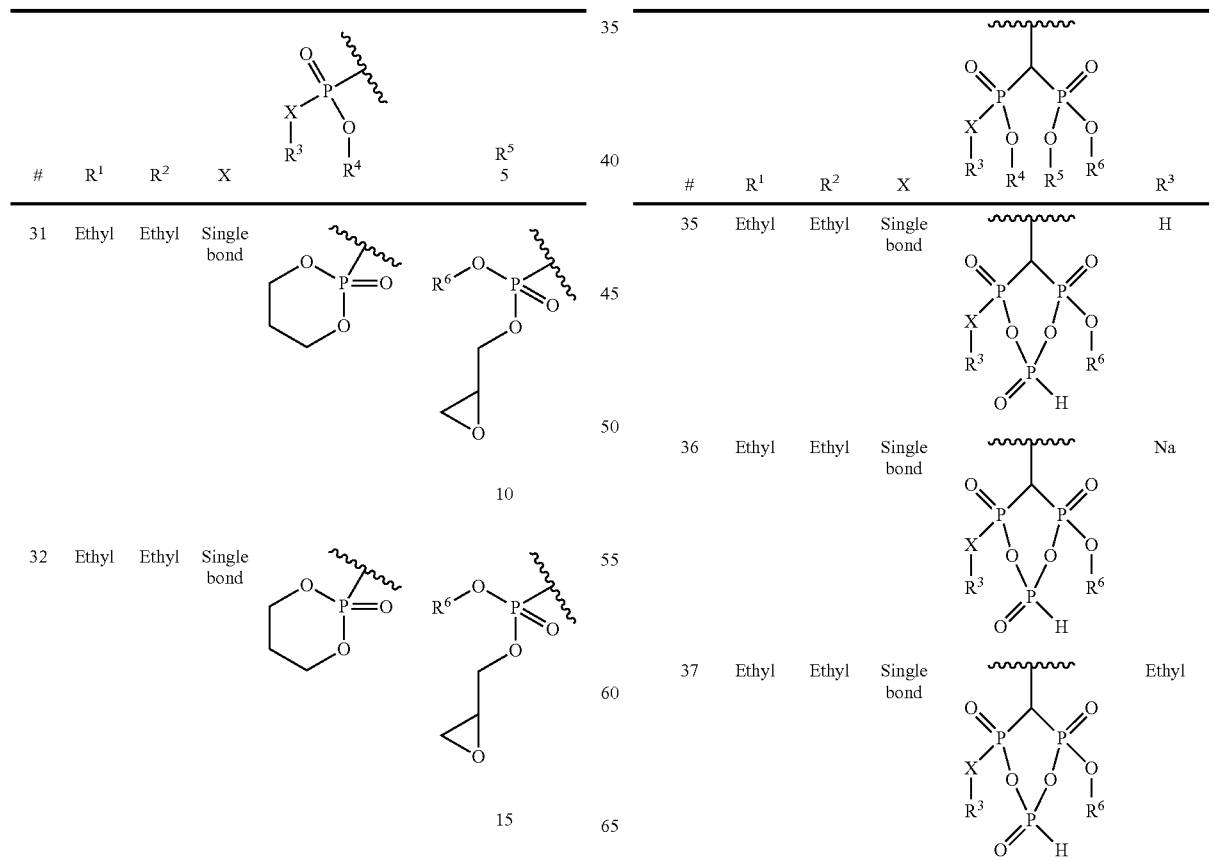

-continued

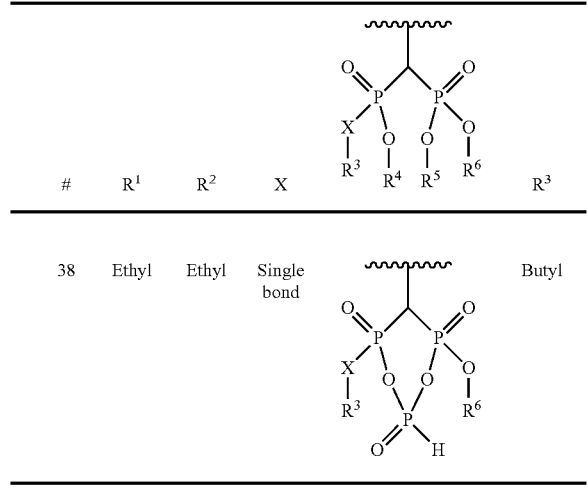

| # | R¹ | R² | X | R³ |
|---|---|---|---|---|
| 38 | Ethyl | Ethyl | Single bond | Butyl |

Embodiments with First Cyclic Functional Group

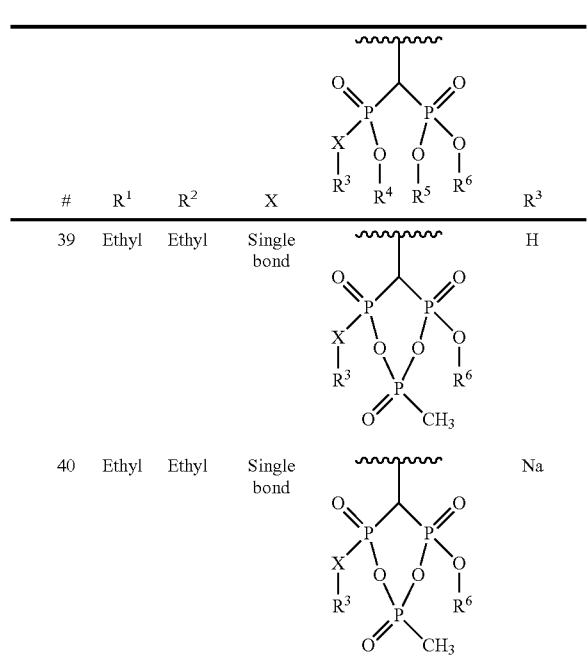

| # | R¹ | R² | X | R³ |
|---|---|---|---|---|
| 39 | Ethyl | Ethyl | Single bond | H |
| 40 | Ethyl | Ethyl | Single bond | Na |
| 41 | Ethyl | Ethyl | Single bond | Ethyl |
| 42 | Ethyl | Ethyl | Single bond | Butyl |

Embodiments with First Cyclic Functional Group

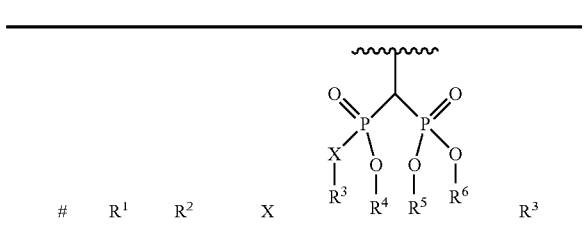

| # | R¹ | R² | X | R³ |
|---|---|---|---|---|
| 43 | Ethyl | Ethyl | Single bond | H |
| 44 | Ethyl | Ethyl | Single bond | Na |
| 45 | Ethyl | Ethyl | Single bond | Ethyl |
| 46 | Ethyl | Ethyl | Single bond | Butyl |

Embodiments with Morpholine, MOMP

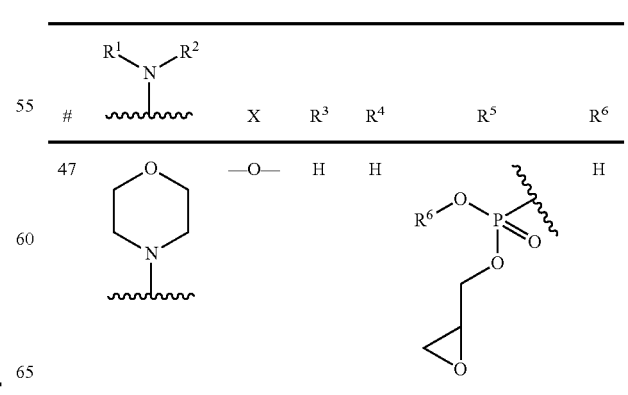

| # | | X | R³ | R⁴ | R⁵ | R⁶ |
|---|---|---|---|---|---|---|
| 47 | | —O— | H | H | | H |

-continued

| # | R¹\N/R² | X | R³ | R⁴ | R⁵ | R⁶ |
|---|---|---|---|---|---|---|
| 48 | morpholine | —O— | Ethyl | Ethyl | phosphate-epoxide | Ethyl |
| 49 | morpholine | —O— | Butyl | Butyl | phosphate-epoxide | Butyl |
| 50 | morpholine | —O— | H | Na | phosphate-epoxide | Na |

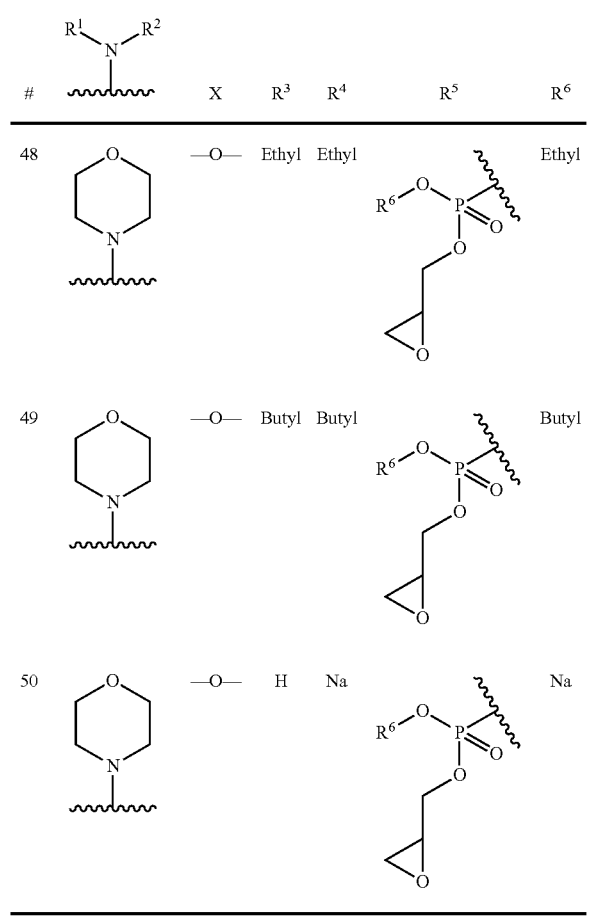

Embodiments with Piperazine, PIMP

| # | R¹\N/R² | X | R³ | R⁴ | R⁵ | R⁶ |
|---|---|---|---|---|---|---|
| 51 | piperazine | —O— | H | H | phosphate-epoxide | H |
| 52 | piperazine | —O— | Ethyl | Ethyl | phosphate-epoxide | Ethyl |
| 53 | piperazine | —O— | Butyl | Butyl | phosphate-epoxide | Butyl |
| 54 | piperazine | —O— | H | Na | phosphate-epoxide | Na |

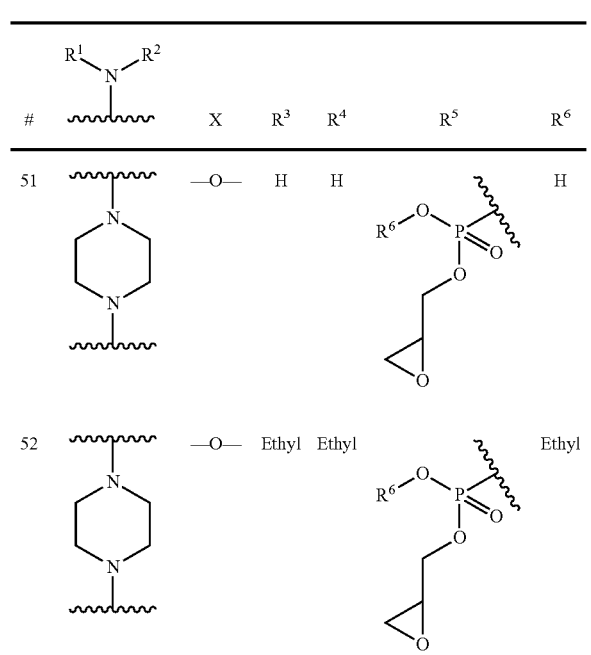
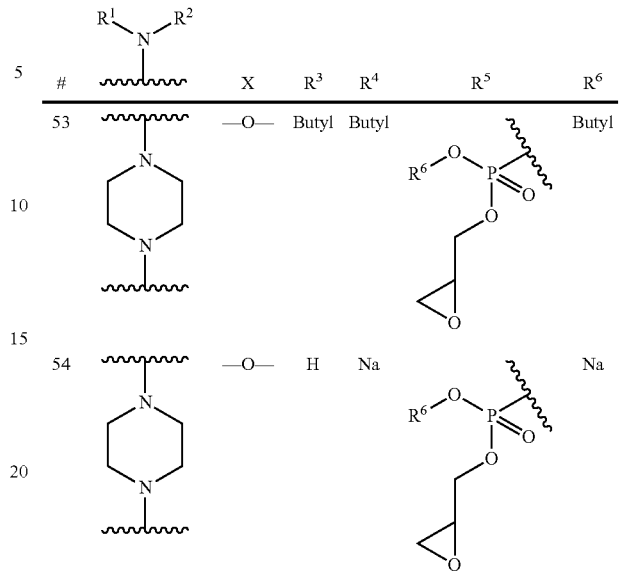

Production Examples for Compositions According to the Invention

Input Substances:

| Name | Manufacturer | Purity/$M_n$ | CAS |
|---|---|---|---|
| 4-Formylmorpholine | Alfa Aesar | 99% | 4394-85-8 |
| N,N-Dimethylformamide | Merck KGaA | ≥99% | 68-12-2 |
| Phosphonic acid | Alfa Aesar | 99+% | 4394-85-8 |
| Acetic acid anhydride | Merck KGaA | ≥98% | 108-24-7 |
| Methylenediphenylisocyanate (MDI) | Sigma Aldrich | $M_n$~340 | 9016-87-9 |
| Polyol | Sigma Aldrich | $M_n$~4000 | 9082-00-2 |
| Pentan | Sigma Aldrich | water-free, ≥99 | 109-66-0 |
| Ethyleneglycol | Sigma Aldrich | water-free, ≥99.8 | 107-21-1 |
| Triethoxymethane | Alfa Aesar | 98% | 122-51-0 |
| Morpholine | Merck | ≥99.0% | 110-91-8 |
| 4-Piperidone-Ethyleneketal | Sigma Aldrich | 98% | 1 77-11-7 |
| Vinyl-bromide in THF (1 M) | Sigma Aldrich | | 593-60-2 |
| 4-Hydroxypiperidine | Merck | 98% | 5382-16-1 |
| 4-Methylene-Piperidine-hydrochloride | Advanced Chemblocks Inc | 95% | 144230-50-2 |
| Triethylamine | Sigma Aldrich | 99% | 121-44-8 |
| Morpholine | Merck | ≥99.0% | 110-91-8 |
| Diethylphosphit | Acros Organics | 98% | 762-04-9 |
| Vinylbromide | Sigma Aldrich | 98% | 593-60-2 |

Further Flame Retardants:
  Budit 240: phosphorus-based, partially cross-linked polyacrylate, produced according to example 1 of WO 2014/124933
  Budit 315: Melamincyanurate from Chemische Fabrik Budenheim KG
  Budit 342: Melaminepolyphosphate from Chemische Fabrik Budenheim KG
  Budit 667: intumescent flame retardant system from Chemische Fabrik Budenheim KG based on ammoniumpolyphosphate
  TCPP: Tris(2-chlorisopropyl)phosphate TCPP of Sigma Aldrich (GAS: 13674-84-5)
  OP 550: Phosphorus-based polyole Exolit OP 550 of Clariant AG (CAS: 184538-58-7)
Measurement Methods:

Dynamic difference calorimetry (DSC)—measurements were taken with a device for simultaneous thermogravimetry—Dynamic difference calorimetry (STA/TG-DSC), Model STA409 PC/3/H Luxx, Netzsch Gerätebau GmbH, in the range from 25 to 500° C. under nitrogen atmosphere with a heating rate of 10K/min. The initial sample weights were approx. 15 mg. The software NETZSCH Proteus was used for analysis.

Thermogravimetric analyses (TAG) were conducted with a device for simultaneous thermogravimetry—Dynamic difference calorimetry (STA/TG-DSC), Model STA409 PC/3/H Luxx, Netzsch GerAtebau GmbH, in the range from 25 to 800° C. under nitrogen atmosphere with a heating rate of 10K/min. The initial sample weights were approx. 12-15 mg. The software NETZSCH Proteus was used to analyze the TGA graphs.

Production Examples for Compositions According to the Invention

Example 1: Synthesis of Morpholin-methylaminodiphosphonic acid (MOMP-H$_4$)

0.1 mol 4-Formylmorpholine were measured into a 500 ml round flask and mixed with 0.2 mol phosphonic acid and 30 ml acetic acid anhydride. The reaction solution was agitated at 65° C. for 90 minutes. The generated acetic acid and excess water were then removed on the rotation evaporator under reduced pressure of ~30 mbar. The residual was then removed from the remaining solvent in the drying cabinet at 85° C., 4 hrs.

Example 2: Synthesis of Piperazin-di(methylaminodiphosphonic acid) (PIMP-H$_4$)

0.28 mol phosphonic acid was dissolved in 31 ml fully de-ionized water in a 250 ml round flask while stirring. A solution of 0.07 mol Diformylpiperazine was dripped into 30 ml fully deionized water over a span of 15 min. A temperature increase of a few degrees was observed during the addition. After the addition ended, the reaction mixture was stirred for 3 hrs. under backflow. After the solution cooled, excess water was removed on the rotational evaporator. A saturated piperazine solution was dripped into the liquid distillation residue. White-amorphous precipitation formed during heating.

Example 3: Synthesis of Dknethyl-methylaminodlphosphonic acid (DAMP-H$_4$)

0.9 mol Dimethylformamide were measured into a 500 ml round flask and mixed with 1.8 mol phosphonic acid and 225 ml acetic acid anhydride. The reaction solution was stirred at 90° C. for 90 minutes. The generated acetic acid and excess water were then removed on the rotation evaporator under reduced pressure of ~300 mbar. The residual was then removed from the remaining solvent in the drying cabinet at 85° C., 4 hrs.

Example 4: Synthesis of an Aqueous Solution of the trianatrium salt of Morpholin-methylaminodiphosphonic acid (MOMP—H—Na$_3$)

0.289 mmol Morpholin-methylaminodiphosphonic acid (MOMP-H$_4$) were dissolved in 50 ml fully de-ionized water, followed by adding 0.867 mmol NaOH. A pH value of ~9 was obtained for the solution.

Example 5: Synthesis of Morpholin-methylaminodlphosphonic tetreethylester (MOMP-H$_4$)

MOMP-Et$_4$ was rendered by measuring 0.1 mol morpholine into the reactor while stirring. 0.1 mol triethoxymethane are then dripped in. 0.2 mol diethylphosphite are then added. The mixture is heated to 120° C. and stirred 4 hrs. at this temperature. After the reaction ends, the product is cleaned by vacuum distillation at 50 mbar and 150° C.

In a preferred embodiment, all substituents $R^3$, $R^4$, $R^5$ and $R^6$ are cations or organic residuals, particularly preferably ethyl, since correspondingly substituted compounds can act as catalysts for the polyurethane foam synthesis. Use of such compounds is particularly advantageous since these accelerate the synthesis and also improve the flame-retarding properties of the finished polymer. Compounds with P—OH groups, such as MOMP-H$_4$, do not exhibit a corresponding catalytic effect, probably because these are present in the form of a dipolar ion (PO$^-$/NH$^+$) whose quaternary amino group does not have a catalytic property.

The so-called start time until foaming is significantly reduced when correspondingly substituted compounds are used compared to compounds with P—OH group, such as MOMP-H$_4$, as will be shown based on the following tests.

General methodology: Polyol (22.5 g) is mixed with the catalyst (Ethylene glycol, 1.05 g) Pentan (4.5 g) and the respective flame retardant at 1000 R/min. The isocyanate (MDI, 60.0 g) is added with the disperser switched off; the mixture is then stirred 10 seconds at 1500 R/min and then promptly refilled.

| Flame retardant | Batch loading [php]* | Time [s] to foaming |
|---|---|---|
| without | 0 | 15 |
| MOMP-H$_4$ | 7.5 | 15 |
| MOMP-H$_4$ | 5.0 | 10 |
| MOMP-H$_4$ | 2.5 | 5 |
| MOMP-Et$_4$ | 10 | 0-1 |
| Exolit OP 550 | 7.5 | 15 |
| Exolit OP 550 | 2.5 | 15 |
| TCPP | 7.5 | 10 |
| TCPP | 2.5 | 10 |

*php-parts per hundred parts of polyol

Example 6: Synthesis of Morpholin-methylaminodi-DOPO (MOM-DOPO$_2$)

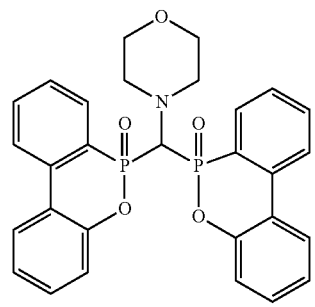 [SMILES: O=P1(C(N2CCOCC2)P2(=O)Oc3ccccc3-c3ccccc32)Oc2ccccc2-c2ccccc21]

| Name | Smp. | Sdp. | M |
|---|---|---|---|
| DOPO (Metadynea DOP11 S25) | ~120° C. | ~400° C. | 216.18 g/mol |
| 4-FM (AlfaAesar > 98%) | 20° C. | 240° C. | 115.13 g/mol |
| Ac$_2$O (Merck > 98%) | −73° C. | 139° C. | 102.09 g/mol |
| MOM-DOPO$_2$ | n.a. | n.a. | 529.47 g/mol |
| Water | 0° C. | 100° C. | 18.02 g/mol |
| Acetic acid | 17° C. | 118° C. | 60.05 g/mol |

This reaction is a condensation reaction that generates the product MOM-DOPO$_2$ from the formyl function on the 4-Formylmorpholine (4-FM) and the P—H groups of the DOPO molecules, with H$_2$O splitting. 40 g DOPO are dissolved in 100 ml acetic acid anhydride (Ac$_2$O) while stirring into a 250 ml beaker, followed by heating the mixture to 120° C. 10 g 4-FM are added when the temperature is reached. The solution is neutralized after 5 hours with 80 ml water, followed by setting exterior tempering. A white solid precipitates after cooling, which is filtered off and washed with water. Acetic acid is generated as a further byproduct.

Example 7: Synthesis of Morpholin-methylaminodlphosphonic acid Zn salt (MOMP-H$_2$)

The Zn salt (1:1) is rendered by dispersing 50.0 g (0.191 mol) MOMP in 500 g H$_2$O, followed by cutting with 14.6 g ZnO (0.191 mol). The reaction mixture is heated to 95° C. and stirred 4 hrs. at this temperature. The batch is then cooled to below 50° C., followed by separating the solids from the mother liquor. The filter cake is dried at 120° C. in circulating air.

| Name | Manufacturer | Purity/M$_n$ | CAS |
|---|---|---|---|
| MOMP | see example 1 | | |
| ZnO | Alfa Aesar | min. 99.0% | 1314-13-2 |
| H$_2$O dest. | | | |

Example 8: Synthesis of Piperazin-di(methylaminodlphosphonic acid) (PIMP-H$_4$)

| Name | Manufacturer | Purity | CAS | Molar Mass |
|---|---|---|---|---|
| 1,4-Diformylpiperazine | Alfa Aesar | 98+% | 4164-39-0 | 142.16 g/mol |
| Acetic acid anhydride | VWR | AnalaR NORMAPU | 108-24-7 | 102.09 g/mol |
| Phosphorous acid | Alfa Aesar | 97% | 13598-3-2 | 82.0 g/mol |
| H$_2$O dest. | | | | |
| NaOH solution 50% | | | 1310-73-2 | 39.997 g/mol |
| Sulfuric acid | Merck | 95-97% | 7664-93-9 | 98.08 g/mol |

0.1 mol 1,4-Diformylpiperazine and 0.1 mol acetic acid anhydride are filled into the reactor and mixed. The mixture is heated to 120° C. 0.4 mol phosphorous acid are dissolved separately in 0.3 mol acetic acid anhydride. This solution is then dripped into the reactor. Finally, a further 0.5 mol acetic acid anhydride are added, followed by heating the batch to 135° C. 2.1 mol water are dripped in after a 30 minute reaction time. The batch is cooled to room temperature after an additional 40 min reaction time. 70 ml sodiumhydroxide solution are then added. The product is separated from the mother liquor and dissolved in water. The solution is then reprecipitated in sulfuric acid, followed by filtering off, washing, and drying the product.

Example 9: Synthesis of diethylphosphite

Phosphonic acid (29.7 g, 0.36 mol) and triethoxymethane (107.3 g, 0.72 mol) are mixed in a 500 ml three-necked flask with distillation apparatus, followed by heating to 90° C. while stirring. After 45 minutes, the temperature is increased to 135° C. to initiate boiling (gas phase temperature 73° C.) and to obtain a first fraction of ethanol and ethylformiate. After boiling stops, vacuum (30 mbar) is applied to obtain a second fraction. The associated product is diethylphosphite. 35.0 g of the colorless, low-odor liquid are obtained.

Example 10: Synthesis of 4-Hydroxy-1-(methylaminodlphosphonic acid) Piperidin ("OH-PIDMP-H$_4$")

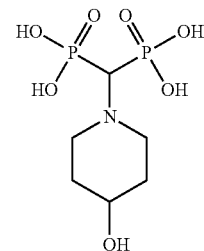

"OH-PIDMP-H$_4$"

"OH-PIDMP-Et$_4$" is rendered by adding 4-Hydroxypiperidin (0.1 mol) to a 250 ml flask and stirring. Triethoxymethane (0.1 mol) is dripped in. 0.2 mol diethylphosphite are then added. The mixture is heated to 120° C., stirred 4 hrs. at this temperature, followed by cleaning the product "OH-PIDMP-Et$_4$" by vacuum distillation at 50 mbar and 150° C.

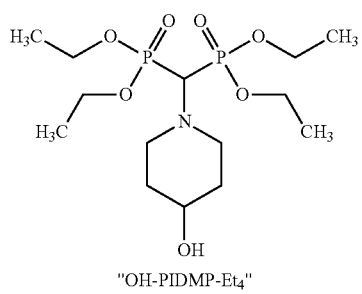

"OH-PIDMP-Et4"

The product is then blended with a 5-fold excess of 1 N HCl, wherein minor heating can be observed. The generated ethanol is distilled off, thus obtaining the product "OH-PIDMP-H$_4$" with a yield of 89%. The melting point is 250° C.

Example 11: Synthesis of 4-Methylene-1-(methyl-aminodlphosphonic acidtetraethylester)-Piperidin ("4-Methylene-PIDMP-Et$_4$")

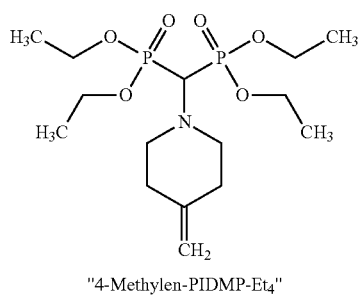 [SMILES: C=C1CCN(C(P(=O)(OCC)OCC)P(=O)(OCC)OCC)CC1]

"4-Methylen-PIDMP-Et4"

"4-Methylen-PIDMP-Et$_4$" is rendered by filling 4-Methylidenpiperidin-hydrochloride (0.05 mol) and triethylamine (0.1 mol) into a 250 ml flask and stirring. Triethoxymethane (0.12 mol) is dripped in. This if followed by adding diethylphosphite (0.31 mol). The mixture is heated to 140° C. and stirred 6 hrs. at this temperature. After cooling to room temperature, diethylether (125 ml) is added, the mixture is neutralized with sodiumhydroxide solution (0.5 N, 50 ml), the phases are separated and the organic phase is washed with 250 ml water. The organic phase is processed by distillation, wherein the product has a boiling point of 180° C. at 2 mmbar. The yield is 58%.

Example 12: Synthesis of 4-Hydroxy-4-Vinyl-1-(methylaminodlphosphonic acid tetra-ethylester)-Piperidin ("OH-Vinyl-PIDMP-Et$_4$")

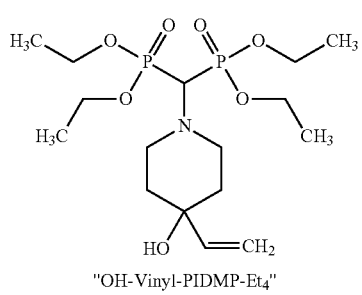 [SMILES: C=CC1(O)CCN(C(P(=O)(OCC)OCC)P(=O)(OCC)OCC)CC1]

"OH-Vinyl-PIDMP-Et4"

"OH-Vinyl-PIDMP-Et$_4$" is rendered by filling 4-Piperidon-Ethylenketal (0.1 mol) into a 250 ml flask and stirring. Triethoxymethane (0.1 mol) is dripped in. 0.2 mol diethylphosphite are then added. The mixture is heated to 120° C., stirred 4 hrs., followed by cleaning the product "Ketal-PIDMP-Et" by vacuum distillation at 50 mbar and 150° C.

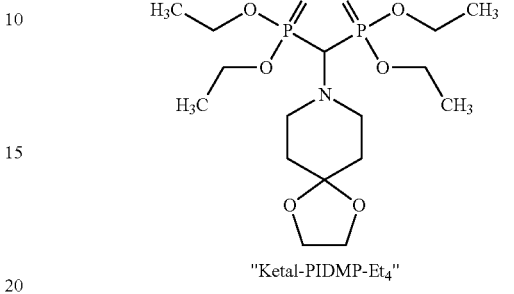

"Ketal-PIDMP-Et4"

"Ketal-PIDMP-Et$_4$" is cut with a 5-fold molar excess of 80% acetic acid and stirred 2 hrs. at 80° C. The generated ethylene glycol is distilled off and the interim product "Keton-PIDMP-Et$_4$" is cleaned by vacuum distillation at 50 mbar and 150° C.

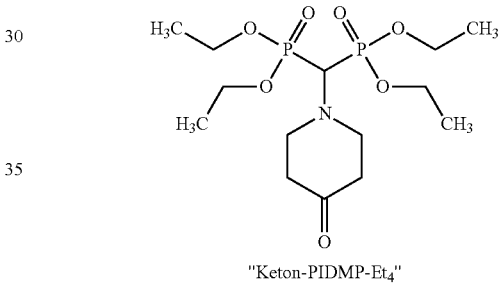

"Keton-PIDMP-Et4"

"OH-Vinyl-PIDMP-Et$_4$" is rendered by filling THF (absolute) as solvent into a water-free apparatus, followed by producing the Grignard reagent therein (c=1.5 molar). Magnesium chips are then added to the THF, while continuously dripping in vinyl bromide (1.2 mmol). The "Keton-PIDMP-Et$_4$" (1 mmol) is continuously dripped in. After the reaction ends (evidenced by reduced boiling, total reaction time: ~2 hrs.), the reaction mixture is hydrolized with cooled 1N HCl(aq). The mixture is processed by separating the aqueous phase and removing the solvent from the organic phase by distillation. The melting point of the obtained "OH-Vinyl-PIDMP-Et$_4$" is 239° C. The reaction yield is 85%.

Flame Retardant Examples:

Compositions

The UL94 test was performed on IEC/DIN EN 60695-11-10 standard-compliant test specimens to verify the flame retarding properties and to classify the flame retardant compositions according to the invention in various polymers.

UL94-V Test

For each measurement, respectively 5 test specimens were clamped in a vertical position, followed by holding the test specimen to the open end of a Bunsen burner flame. The burn time and also the dropping of burning particles were evaluated with a cotton pad arranged under the test specimen. The tests and exposure to a 2 cm high Bunsen burner flame were accurately performed as specified by Underwriter Laboratories, Standard UL94.

The classification into fire protection classes V-0 to V-2 are cited as results. V-0 in this case means that the total burn time of 5 tested test specimens was less than 50 seconds and that the cotton pad was not set aflame by glimmering or burning droplets of the test specimen. The classification V-1 means that the total burn time of 5 tested test specimens was more than 50 seconds but less than 250 seconds and that the cotton pad was likewise not set aflame. V-2 in this case means that the total burn time of 5 tested test specimens was less than 250 seconds but that the cotton pad was set aflame by glimmering or burning droplets in at least one of the 5 tests. The abbreviation NC means "not classifiable" and indicates that a total burn time of more than 250 seconds was measured. In many cases of non-classifiability, the test specimen burned completely.

UL94-HB Test

For each measurement, respectively at least 3 test specimens were clamped in a horizontal position, followed by holding the test specimen to the open end of a Bunsen burner flame. This involved evaluating the burn rate and the total burn distance. The tests and exposure to a 2 cm high Bunsen burner flame were accurately performed as specified by Underwriter Laboratories, Standard UL94.

The classification into fire protection class HB is cited as the result. The "HB" classification means that the burn rate between two markers, the first at a 25 mm distance from the flame-facing end, the second at a 100 mm distance from the flame-facing end, was less than 40 mm/min. The flame front also did not exceed the 100 mm marker The "NC" classification means "Not Classifiable" and indicated that the burn rate over a distance of 75 mm was >40 mm/min or the total burn distance was >100 mm.

L*a*b* Values

The L*a*b* values were determined with an UltraScan VIS-2 Spectralphotometer equipped with the UltraScanVIS Sensor from HunterLab. The samples were for this purpose filled into a glass cuvette, followed by impacting the cuvette or densifying the sample to create a homogeneous surface on the cuvette side toward the measurement opening. The associated Easy Match QC 4.64 b software uses the "USVIS 1145" Sensor and "RSIN Mode" setting to calculate the L*a*b* values.

The method is compliant with EN ISO 11664-4 in its currently valid version.

Example 13: Flame-Retardant Properties of MOMP-$H_4$ in Polypropylene

Polymers

The following polymer materials were used in the examples to follow to produce the flame-retarding compositions:

Polypropylene (PP) HD120 MO from Borealis AG

A twin screw extruder, model Process 11, Thermo Fisher Scientific Inc., was used to produce a granulate with approximate grain size 3×1×1 mm at extrusion conditions typical for polypropylene. The extrusion process was run at an approximate throughput of 5-7 kg/h and at a screw speed of 450-500 rpm and a temperature of the extrusion zone of 190-220° C. High-quality UL94-compliant test specimens were then obtained by hot pressing. The thickness of the test specimens was 1.6 and 3.2 mm respectively. The phosphonate produced according to example 1 was then incorporated into the polymer material during the extrusion process.

TABLE 1

| # | PP [%] | Thickness [mm] | MOMP [%] | Budit 667 | Budit 240 | UL94 | $t_1$ | $t_2$ | $t_{ges}$ |
|---|---|---|---|---|---|---|---|---|---|
| 0 | 100 | 1.6 | 0 | — | — | N.C. | 376* | —* | 376 |
| 1 | 75 | 1.6 | 25 | — | — | N.C. | 95 | 70 | 165 |
| 2 | 72.5 | 1.6 | 27.5 | — | — | V-2 | 9 | 54 | 63 |
| 3 | 75 | 3.2 | 25 | — | — | V-0. | 4 | 6 | 10 |
| 4 | 72.5 | 3.2 | 27.5 | — | — | V-0 | 4 | 4 | 8 |
| 5 | 75 | 3.2 | — | 25 | — | V-0 | 5 | 5 | 10 |
| 6 | 75 | 1.6 | — | — | 25 | N.C | 231 | 34 | 265 |
| 7 | 72.5 | 1.6 | — | — | 27.5 | N.C | 227 | 28 | 255 |

Example 14: Flame-Retardant Properties of MOMP-$H_4$ in Polyurethane (PU)

The flame-retardant compositions were produced by converting the following components together in a foaming reaction:

Polyol: 22.5 g

Catalyst (ethylene glycol): 1.05 g

Pentan: 4.5 g

Isocyanate (MDI): 60 g

The flame retardant according to the invention was added to the polyol component prior to the reaction. The mass ratios of the flame retardant cited in the following table refer to the sum of the masses of polyol, catalyst, flame retardant, and isocyanate.

| # | PU [%] | Flame retardant [%] | Batch load [%] | UL94-HB | $t_{ges}$ |
|---|---|---|---|---|---|
| 0 | 100 | — | — | N.C. | 50 |
| 1 | 98.2 | MOMP-$H_4$ | 1.8 | HB | 7 |
| 2 | 98.2 | MOMP-2K# | 1.8 | N.C. | 30 |
| 3 | 91.8 | MOMP-2K# | 8.2 | N.C. | 20 |
| 4 | 98.2 | DAMP-$H_4$ | 1.8 | HB | 4 |
| 5 | 98.2 | TCPP | 1.8 | N.C. | 26 |
| 6 | 97.1 | OP 550 | 2.9 | HB | 32 |
| 7 | 97.4 | MOMP-$Et_4$ | 2.6 | HB | 4 |
| 8** | 97.4 | MOMP-$Et_4$ | 2.6 | HB | 6 | double potassium salt of MOMP-$H_4$
**w/o catalyst

Example 15: Flame-Retardant Properties of MOMP-$H_4$ in Thermoplastic Polyurethane (PU)

The following polymer materials were used in the examples to follow to produce the flame-retarding compositions:

Thermoplastic Polyurethane (TPU) Elastollan 1185 A from BASF SE

A twin screw extruder, model Process 11, Thermo Fisher Scientific Inc., was used to produce a granulate with approximate grain size 3×1×1 mm at extrusion conditions typical for TPU. The extrusion process was run at an approximate throughput of 5 kg/h and at a screw speed of 300 rpm and a temperature of the extrusion zone of 205° C. High-quality UL94-compliant test specimens were then obtained by hot pressing. The thickness of the test specimens was 0.8 mm. The phosphonate produced according to example 1 was then incorporated into the polymer material during the extrusion process.

| # | TPU [%] | Budit 315 [%] | Budit 342 [%] | Budit 240 [%] | MOMP [%] | Batch load [%] | UL94 | $t_1$ | $t_2$ | $t_{ges}$ | Info |
|---|---|---|---|---|---|---|---|---|---|---|---|
| 0 | 100 | — | — | — | — | 0 | N.C. | 323⁻ | —⁻ | 323 | butc * |
| 1 | 90 | — | 5 | — | 5 | 10 | V-2 | 4 | 2 | 6 | 4/5 ditc# |
| 2 | 90 | 5 | — | — | 5 | 10 | V-0 | 2 | 4 | 6 | — |
| 3 | 90 | — | — | — | 10 | 10 | V-0 | 9 | 5 | 14 | — |
| 4 | 90 | 10 | — | — | — | 10 | V-0 | 3 | 5 | 8 | — |
| 5 | 90 | — | 10 | — | — | 10 | V-2 | 11 | 5 | 16 | 5/5 ditc# |
| 6 | 90 | 5 | — | 5 | — | 10 | V-2 | 3 | 1 | 4 | 5/5 ditc# |

*butc = test sample burns down to the clamp
ditc = falling droplets set cotton aflame
⁻second flame exposure not possible because test specimen already burned off after first flame exposure

Example 16: Flame-Retardant Properties of MOMP-H₂Zn in Thermoplastic Polyamide (PA)

The following materials were used in the examples to follow to produce the flame-retarding compositions:
Polyamide 6: Ultramid B3S (BASF)
Glass fibers (GF) for PA: CS7928 (Lanxess)

A twin screw extruder, model Process 11, Thermo Fisher Scientific Inc., was used to produce a granulate with approximate grain size 3×1×1 mm at extrusion conditions typical for PA6. The extrusion process was run at an approximate throughput of 5 kg/h and at a screw speed of 300 rpm and a temperature of the extrusion zone of 280° C. High-quality UL94-compliant test specimens were then obtained by hot pressing. The thickness of the test specimens was 0.8 mm. The phosphonate produced according to example 7 (MOMP-H₂Zn) was then incorporated into the polymer material during the extrusion process.

Transparency Measurement

In order to verify the transparency of recipes A and B, the recipes were each applied as a coating using a 500 μm scraper, in each case on a white and a black substrate. The L*a*b values were then determined for each substrate for respectively two samples with coating (tests No. 1 and 2) and for respectively two control samples (tests No. 3 and 4) without coating.

As shown in the tables below, coatings with recipe A and B only cause negligible changes of the values in the L*a*b color space, e.g. the coating have high transparency and either do not or only immaterially impact the appearance of the substrate. The flame retardants according to the invention are therefore particularly suited for use in transparent coatings.

| # | PA6 [%] | FG [%] | Budit 611 [%] | Exolit** [%] | MOMP H₂Zn | Budit 341 [%] | UL94-V | $t_1$ [s] | $t_2$ [s] | $t_{ges}$ [s] | Info |
|---|---|---|---|---|---|---|---|---|---|---|---|
| 0 | 44.8 | 30 | 23 | 2.2 | | | V0 | 8 | 10 | 18 | |
| 1 | 55 | 30 | | | 15 | | N.C. | 243 | ~ | | butc |
| 2 | 50 | 30 | | | 20 | | V0 | 12 | 5 | 17 | |
| 3 | 45 | 30 | | | 25 | | V0 | 6 | 2 | 8 | |
| 4 | 45 | 30 | | | 17.5 | 7.5 | V0 | 9 | 9 | 18 | |

*butc = test sample burns down to the clamp
**Exolit OP 1230
~second flame exposure not possible because test specimen already burned off after first flame exposure

Example 17: Flame-Retarding and Transparency Properties of MOMP-Et₄ in a Thermoplastic Polyurethane Coating A polyurethane resin top-coat Goylake A-1219-9 from Irurena Group was cut with MOMP-Et₄ and mixed while stirring vigorously. The ratio of MOMP-Et₄ in the total mass (250 g) consisting of the mass of MOMP-Et₄ and the mass of the polyurethane resin was 5% by weight (recipe A) or 10% by weight (recipe B). In relation to this total mass, respectively 10% by weight of the curing catalyst C-212 from Irurena Group were added, followed by mixing the mixture while stirring vigorously.

The transparent mixtures were then applied onto a commercially available chipboard using a 500 μm scraper, followed by drying the panel at 80° C.

The subsequent Epiradiator fire test according to NF P 92-501 resulted in an M3 classification, both with recipe A and also with recipe B.

Recipe A
Black Substrate

| # | Coating | L* | a* | b* |
|---|---|---|---|---|
| 1 | + | 10.2 | −0.5 | −1.3 |
| 2 | + | 9.1 | −0.5 | −1.3 |
| 3 | − | 8.2 | −0.3 | −1.4 |
| 4 | − | 8.1 | −0.4 | −1.2 |

White Substrate

| # | Coating | L* | a* | b* |
|---|---|---|---|---|
| 1 | + | 90.8 | −0.5 | 1.6 |
| 2 | + | 90 6 | −0.5 | 1.7 |
| 3 | − | 91.2 | −0.8 | 1.5 |
| 4 | − | 91.1 | −0.9 | 1.5 |

Recipe B
Black Substrate

| #  | Coating | L*  | a*   | b*   |
|----|---------|-----|------|------|
| 1  | +       | 9.0 | −0.4 | −1.4 |
| 2  | +       | 9.0 | −0.4 | −1.5 |
| 3  | −       | 8.6 | −0.4 | −1.3 |
| 4  | −       | 8.4 | −0.3 | −1.3 |

White Substrate

| #  | Coating | L*   | a*   | b*  |
|----|---------|------|------|-----|
| 1  | +       | 90.8 | −0.6 | 2   |
| 2  | +       | 90.7 | −0.4 | 1.9 |
| 3  | −       | 91.1 | −0.9 | 1.6 |
| 4  | −       | 91.2 | −0.8 | 1.4 |

DESCRIPTION OF FIGURES

The enclosed figures represent thermogravimetric measurements; they show in.

Figure 1:
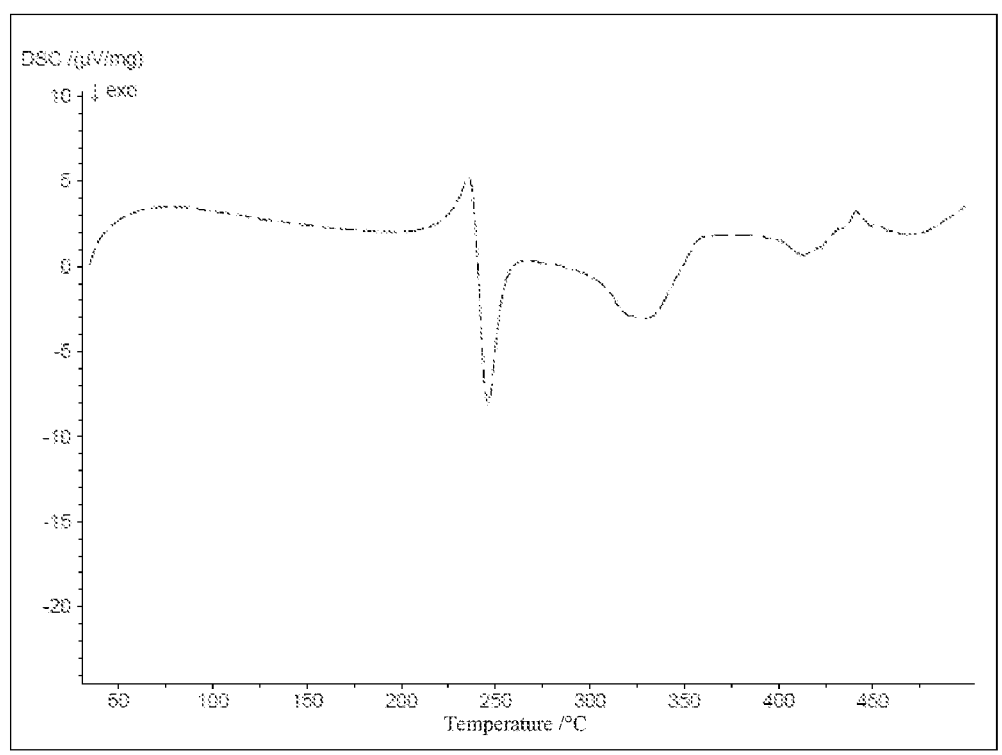
FIG. 1: Difference calorimetric measurement of DAMP-H4
Figure 2:
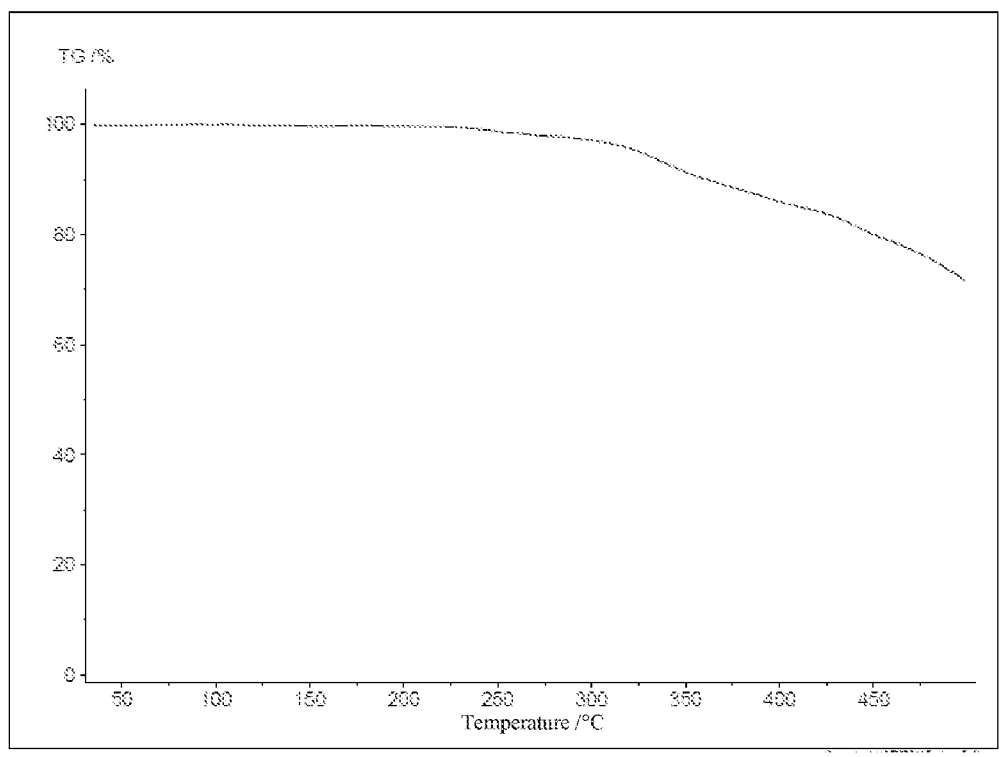
FIG. 2: Thermogravimetric measurement of DAMP-H4
Figure 3:
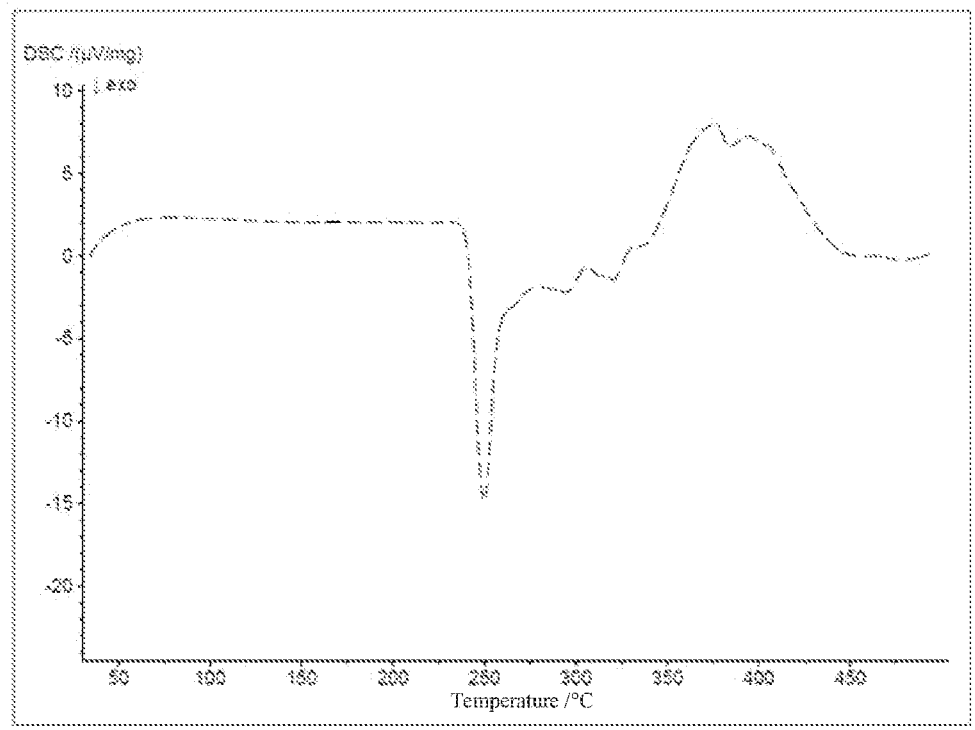
FIG. 3: Difference calorimetric measurement of MOMP-H4
Figure 4:
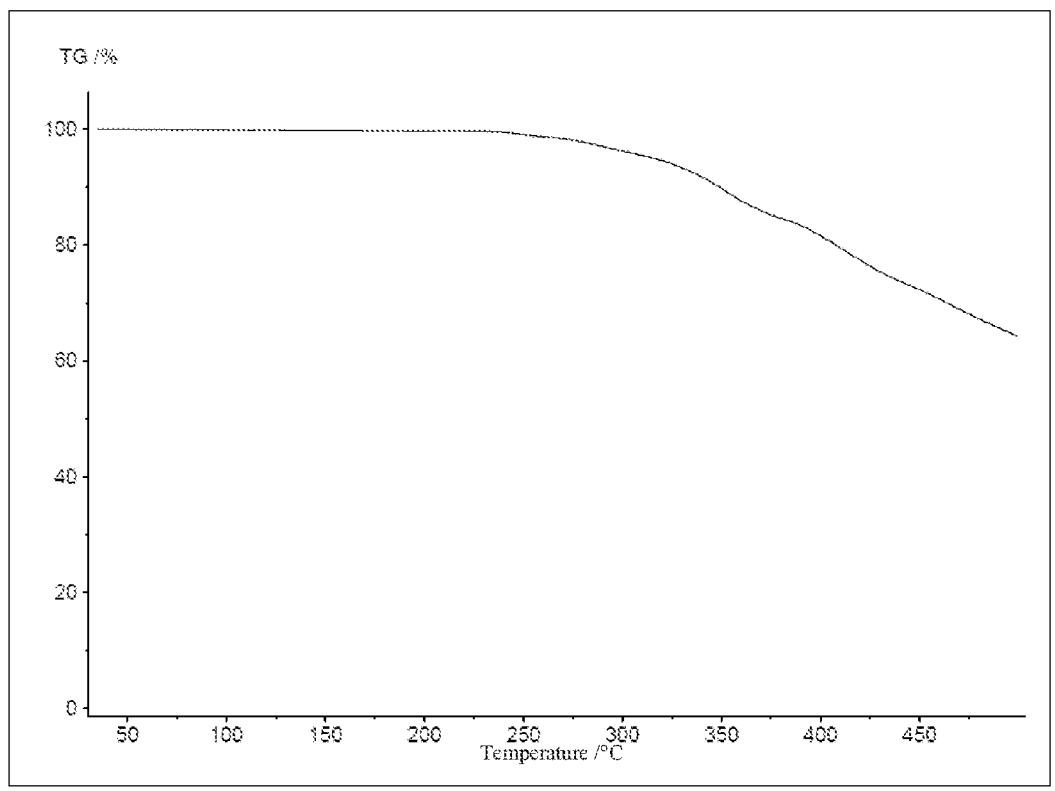
FIG. 4: Thermogravimetric measurement of MOMP-H4
Figure 5:
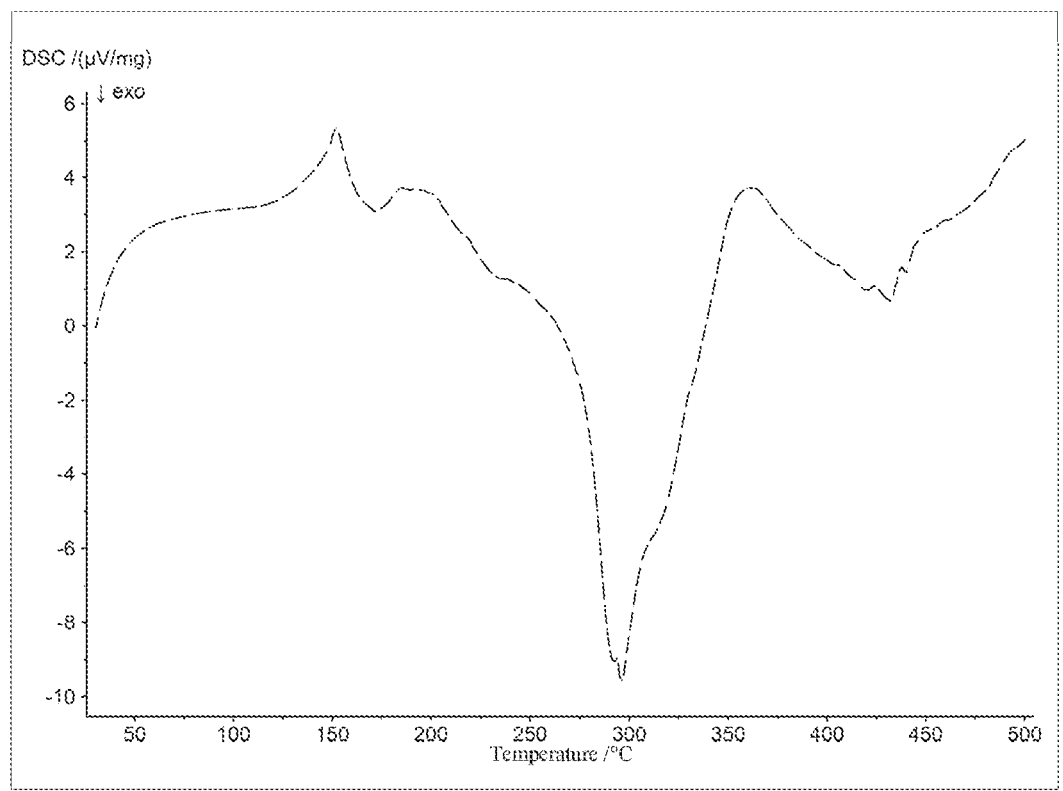
FIG. 5: Difference calorimetric measurement of ATMP
Figure 6:
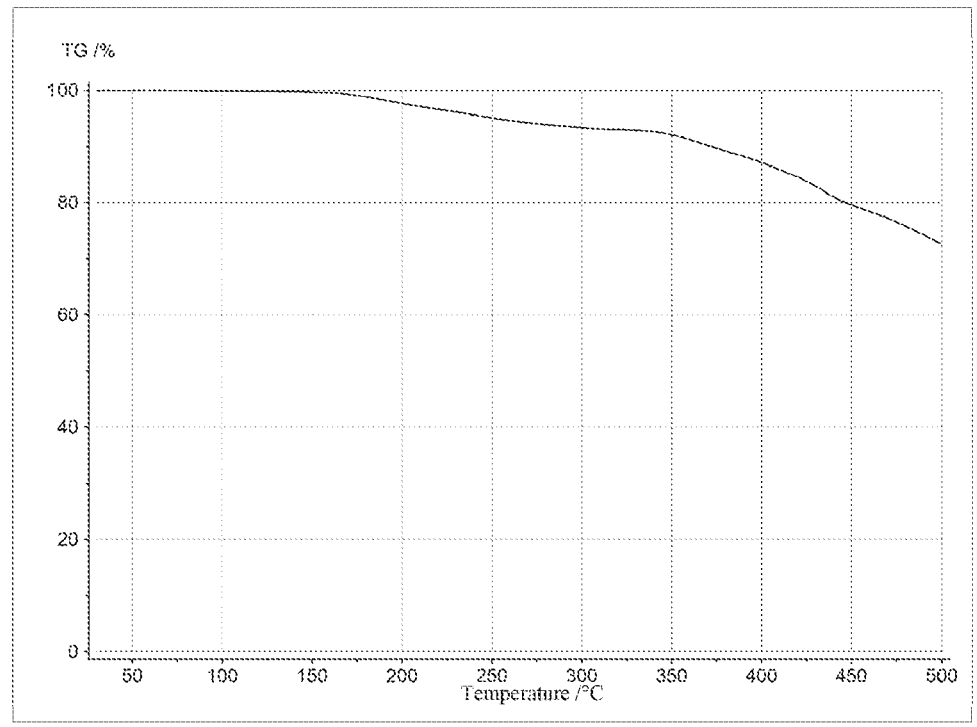
FIG. 6: Thermogravimetric measurement of ATMP
Figure 7:
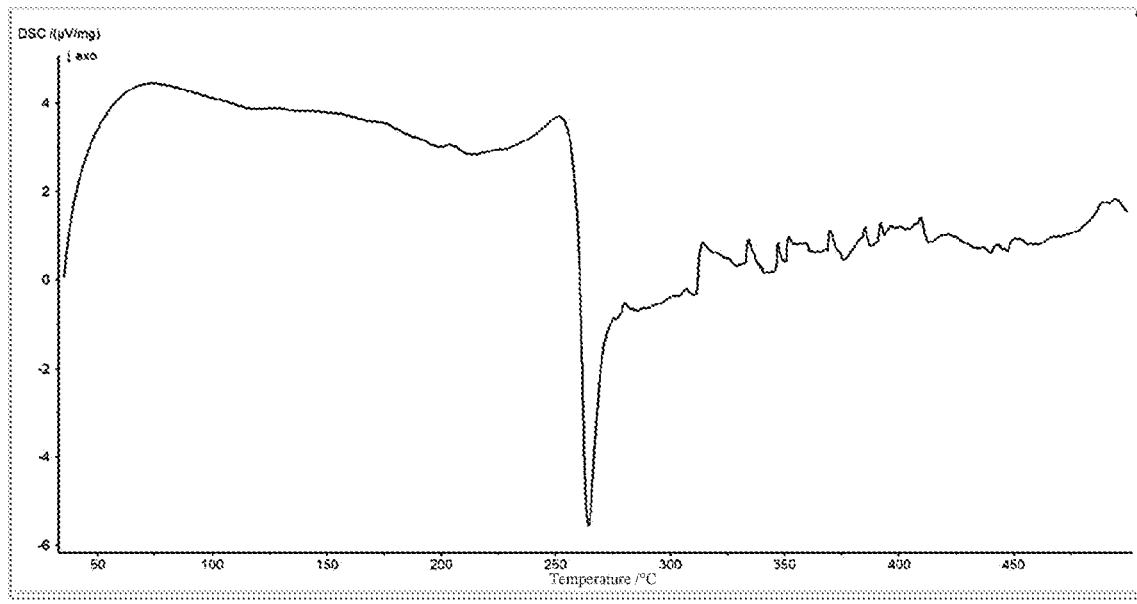
FIG. 7: Difference calorimetric measurement of MOMP-Et4
Figure 8:
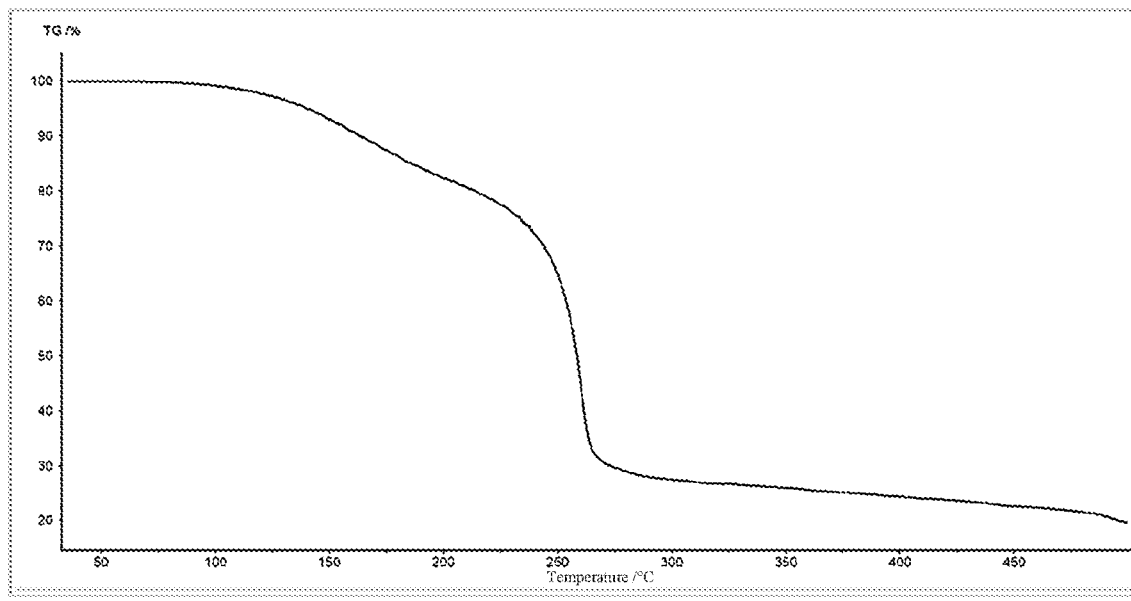
FIG. 8: Thermogravimetric measurement of MOMP-Et4
Figure 9:
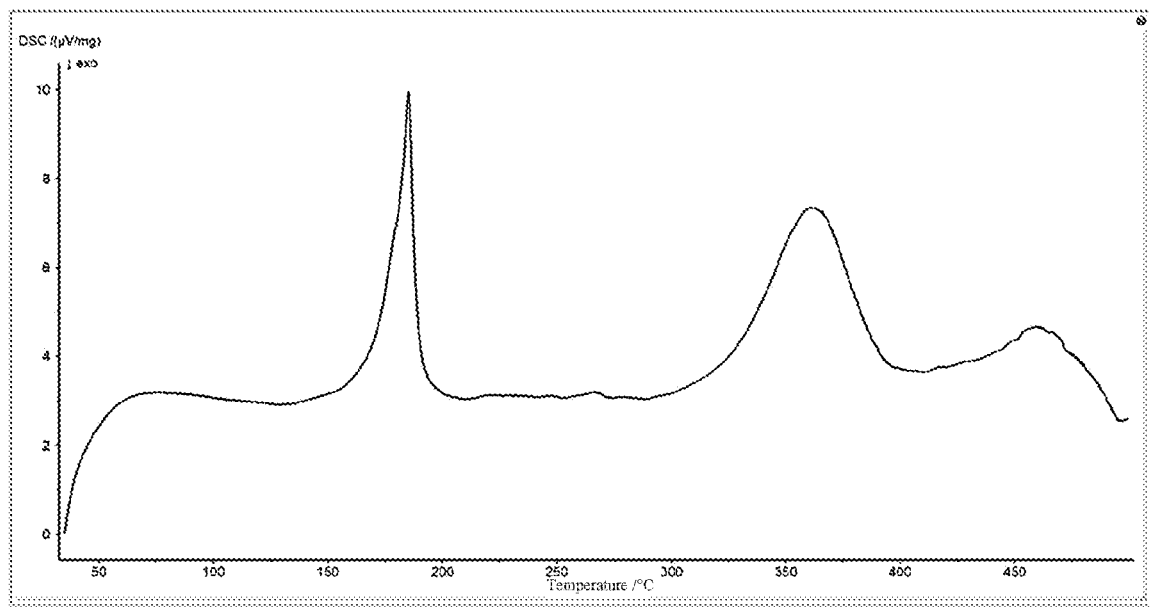
FIG. 9: Difference calorimetric measurement of MOMP-DOPO2
Figure 10:
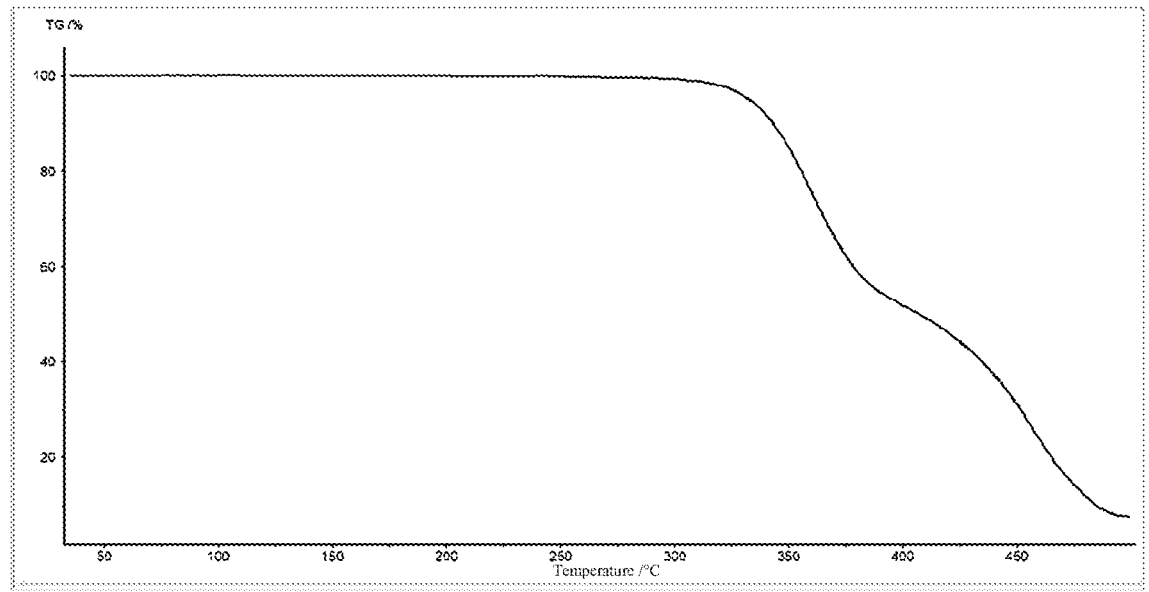
FIG. 10: Thermogravimetric measurement of MOM-DOPO2
Figure 11:
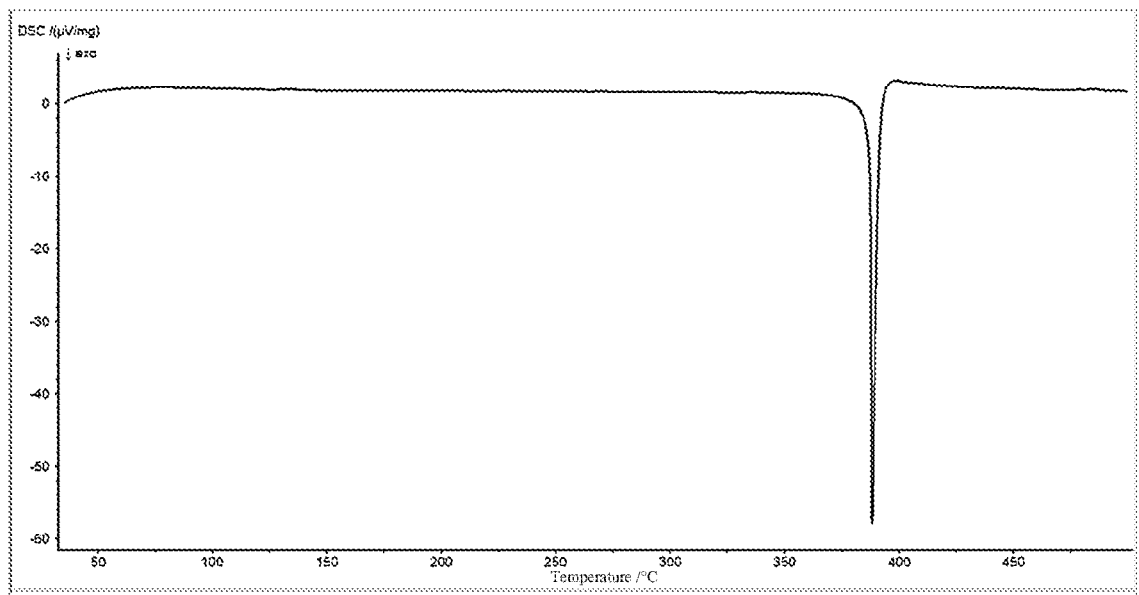
FIG. 11: Difference calorimetric measurement of MOMP-H2Zn
Figure 12:
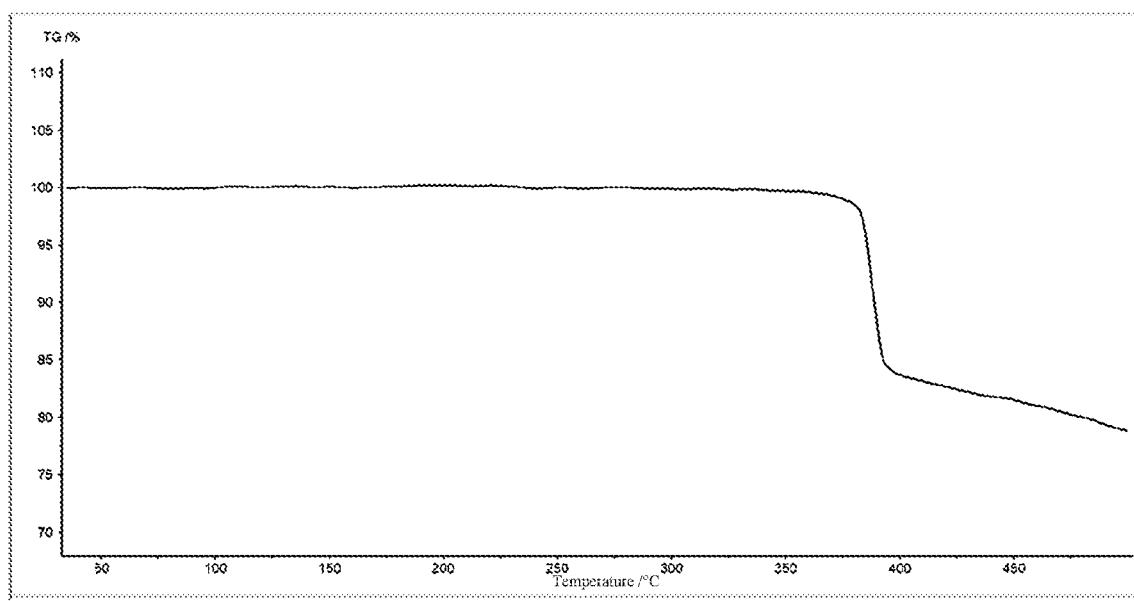
FIG. 12: Thermogravimetric measurement of MOMP-H2Zn
Figure 13:
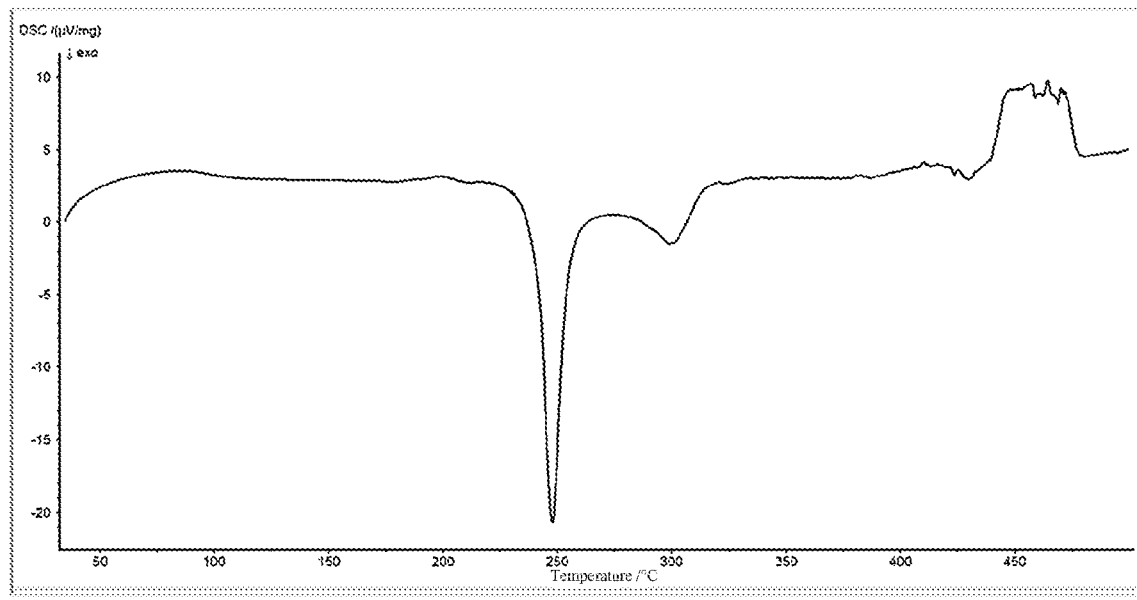
FIG. 13: Difference calorimetric measurement of PIMP
Figure 14:
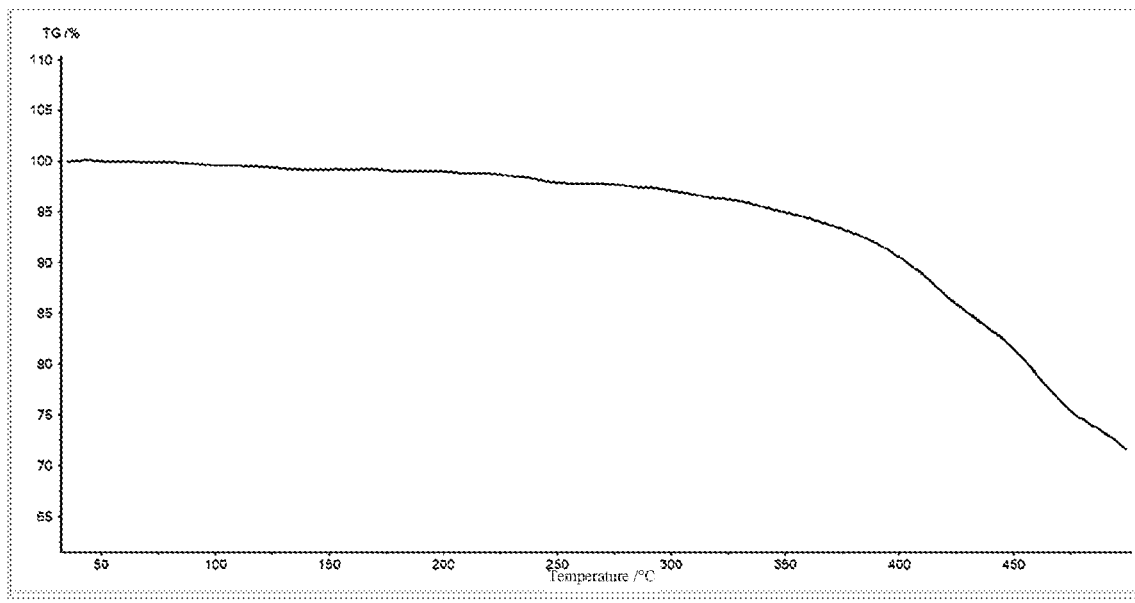
FIG. 14: Thermogravimetric measurement of PIMP

| Material              | 1% Weight Loss | 2% Weight Loss | Residual Mass at 500° C. |
|-----------------------|----------------|----------------|--------------------------|
| MOMP-H$_4$            | 251.7° C.      | 276.9° C.      | 64.29%                   |
| DAMP-H$_4$            | 244.5° C.      | 273.1° C.      | 71.41%                   |
| ATMP-H$_4$            | 176.4° C.      | 193.9° C.      | 72.43%                   |
| MOMP-Et$_4$           | 101.7° C.      | 117.1° C.      | 19.58%                   |
| MOM-DOPO$_2$          | 305.5° C.      | 318.9° C.      | 7.50%                    |
| MOMP-H$_2$Zn          | 375.0° C.      | 382.3° C.      | 78.75%                   |
| PIMP-H$_4$            | 199.3° C.      | 245.4° C.      | 71.63%                   |

The invention claimed is:

1. A composition comprising a polymer material and a halogen-free flame retardant contained and/or bound therein in a quantity of 1 to 40% by weight in relation to the entire composition, wherein the flame retardant is a compound of the formula (I), its corresponding ammonium salt, its corresponding phosphonate salt or a mixture of the aforementioned:

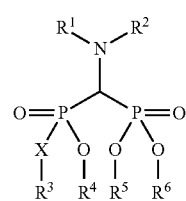

(I)

wherein (N-i) $R^1$ and $R^2$ are identical or different substituents and are selected from the group consisting of linear, branched, or cyclic alkyls, alkenyls and alkinyls, unsubstituted and alkyl-substituted phenyls, mononuclear and multinuclear aromatics with up to 4 nuclei, mononuclear or multinuclear heteroaromatics with up to 4 nuclei, silyls, allyl, alkyl, or aryl alcohols, or (N-ii) $R^1$ and $R^2$ together, including the N atom, form a saturated or monounsaturated or polyunsaturated heterocycle with 4-8 ring atoms, selected from carbon, oxygen, sulfur, phosphorus, silicon, and nitrogen, and wherein —X— is an oxygen atom, —O—, or —X— is a single bond, and wherein $R^3$, $R^4$, $R^5$ and $R^6$ are identical or different substituents and are selected from (P-i) the group consisting of H, linear, branched, or cyclic alkyls, alkenyls and alkinyls, unsubstituted and alkyl-substituted phenyls, multinuclear aromatics having up to 4 nuclei, mononuclear or multinuclear heteroaromatics having up to 4 nuclei, silyls, allyl, alkyl or aryl alcohols, of the following structures (III) and (IV), where n=0 to 100,

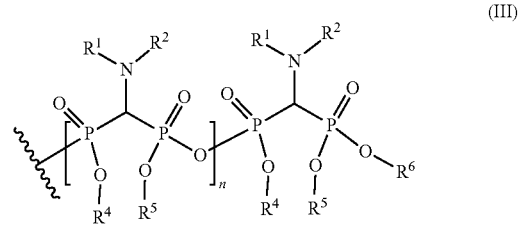

(III)

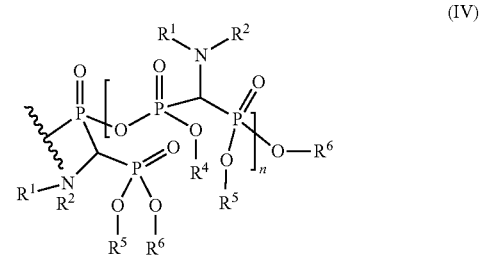

(IV)

and cations wherein the cation is Na$^+$, K$^+$, Mg$^{2+}$, Ca$^{2+}$, B$^{3+}$, Al$^{3+}$, Zn$^{2+}$, NH$^{4+}$ or the ammonium ion of an amine compound, selected from the group consisting of melamine or its condensation products, urea, guanidine, morpholine, and piperazine, and/or (P-ii) when —X— is an oxygen atom, —O—, —OR$^3$ and —OR$^4$ together and/or —OR$^5$ and —OR$^6$ together and/or —OR$^3$ and —OR$^5$ together and/or —OR$^4$ and —OR$^6$ together, including the P atom of the phosphonate group, form a cyclic phosphonic acid ester or a cyclic phosphonic acid anhydride having a ring size of 4-10 atoms, and/or (P-iii) when —X— is a single bond, —R$^3$ and —OR$^4$ and/or —R$^3$ and —OR$^5$ together, including the P atom of the phosphinate group, form a cyclic phosphinic acid ester or a cyclic phosphinic acid anhydride having a ring size of 4-10 atoms and/or —OR$^5$ and —OR$^6$ and/or —OR$^4$ and —OR$^6$ together, including the P atom of the phosphonate group, form a cyclic phosphonic acid ester or a cyclic phosphonic acid anhydride having a ring size of 4-10 atoms, wherein A.) one of the substituents R$^1$ to R$^6$ or
B.) one of the cycles formed when
  1) The substituents R$^3$-R$^6$ form a cyclic phosphinic or phosphonic acid ester according to (P-ii) or (P-iii), or
  2) The substituents R$^3$-R$^6$ form a cyclic phosphinic or phosphonic acid anhydride according to (P-ii) or (P-iii), or
  3) The substituents R$^1$ and R$^2$ form a heterocycle according to (N-ii), has a first uncharged or negatively charged functional group that has a heteroatom selected from the group consisting of P, O, N, S, I, CI, Br, F, wherein the functional group is not-OH, and for the case that one of the cycles according to 1) to 3) has the functional group, the ring atoms of the cycles are substituted with the functional group or with a substituent that has the functional group, and wherein the term "halogen-free" means that the total halogen content is <1000 ppm by weight.

2. The composition according to claim 1, wherein at least one of the substituents R$^1$ to R$^6$ or any of the cycles formed by the substituents R$^1$ to R$^6$ have at least one further functional group that has a heteroatom selected from the group consisting of N, S, O, Si, I, Cl, Br, F and/or an alkene or alkine group.

3. The composition according to claim 1, wherein the first functional group is selected from the group consisting of —NH$_2$, —NHR, —NR$_2$, —OR, =O, —SH, —SR, —COOH, —COOR, —OCN, —I, —Cl, —Br, —F, —N$_3$, epoxy, lactam, lacton, aziridine, glycolide, oxazoline, and ether, where R=alkyl, alkenyl, alkinyl or aryl and x+y=3.

4. The composition according to claim 1, wherein the flame retardant has a covalent bond to the polymer material.

5. The composition according to claim 1, wherein R$^1$ and R$^2$ are identical substituents.

6. The composition according to claim 1, wherein the flame retardant is dry, which means its water content is <0.5% by weight, and reaches a loss of mass of 10% by weight starting at a temperature of 180° C.

7. The composition according to claim 1, wherein the flame retardant has a phosphorus content, which is at least 10.0% by weight.

8. The composition according to claim 1, wherein at least one of the groups R$^3$, R$^4$, R$^5$ and Re are a cation or H, wherein the cation is Na$^+$, K$^+$, Mg$^{2+}$, Ca$^{2+}$, B$^{3+}$, Al$^{3+}$, Zn$^{2+}$, NH$^{4+}$ or the ammonium ion of an amine compound, selected from the group consisting of melamine or its condensation products, urea, guanidine, morpholine, and piperazine.

9. The composition according to claim 1, wherein the polymer material contains the flame retardant in a quantity of at least 3% by weight and in a quantity of not more than 35% by weight, in relation to the entire composition.

10. The composition according to claim 1, wherein the composition comprises at least one further flame-retardant component that is selected from nitrogen bases, melamine derivates, phosphates, pyrophosphates, polyphosphates, organic and inorganic phosphinates, organic and inorganic phosphonates and derivates of the aforementioned compounds.

11. A method for producing a composition according to claim 1, wherein the flame retardant is a co-condensation component or a co-addition component of the polymer material that is incorporated into the polymer material during production by polycondensation or polyaddition.

12. The composition according to claim 2, wherein the further functional group are selected from the group consisting of —NH$_2$, —NHR, —NR$_2$, —OH, —OR, =O, —SH, —SR, —COOH, —COOR, —OCN, —SIR$_x$H$_y$, —I, —Cl, —Br, —F, —N$_3$, epoxy, lactam, lacton, aziridine, glycolide, oxazoline, ether, alkenylene and alkinylene, where R=alkyl, alkenyl, alkinyl or aryl and x+y=3.

13. The composition according to claim 12, wherein the further functional group is an alkenyl or epoxy group.

* * * * *